US 12,224,113 B2

(12) United States Patent
Raminosoa et al.

(10) Patent No.: US 12,224,113 B2
(45) Date of Patent: Feb. 11, 2025

(54) WIRELESS EXCITATION SYSTEM

(71) Applicant: UT-Battelle, LLC, Oak Ridge, TN (US)

(72) Inventors: Tsarafidy Raminosoa, Oak Ridge, TN (US); Jason L. Pries, Oak Ridge, TN (US); Randy H. Wiles, Oak Ridge, TN (US); Jonathan P. Wilkins, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 915 days.

(21) Appl. No.: 17/318,248

(22) Filed: May 12, 2021

(65) Prior Publication Data

US 2021/0358686 A1    Nov. 18, 2021

Related U.S. Application Data

(60) Provisional application No. 63/023,525, filed on May 12, 2020.

(51) Int. Cl.
*H01F 27/28* (2006.01)
*H01F 38/02* (2006.01)
*H01F 38/14* (2006.01)
*H01F 38/18* (2006.01)
*H02J 50/10* (2016.01)

(52) U.S. Cl.
CPC .......... *H01F 38/18* (2013.01); *H01F 38/023* (2013.01); *H01F 38/14* (2013.01); *H02J 50/10* (2016.02); *H01F 2038/146* (2013.01)

(58) Field of Classification Search
CPC ........ H01F 38/18; H01F 38/023; H01F 38/14; H01F 27/346; H01F 27/327; H01F 2038/146; H02J 50/10; H02J 50/005; H02J 50/12
USPC .......................................... 336/120, 221, 212
See application file for complete search history.

(56) References Cited

U.S. PATENT DOCUMENTS

| 4,347,491 A * | 8/1982 | Chass ..................... H01F 21/06 |
| | | 241/606 |
| 4,815,052 A * | 3/1989 | Walker ................... H02H 7/125 |
| | | 363/54 |
| 2002/0057164 A1* | 5/2002 | Jin .......................... H01F 38/18 |
| | | 336/115 |
| 2014/0178196 A1* | 6/2014 | Lucas ....................... F01D 5/34 |
| | | 416/1 |

(Continued)

OTHER PUBLICATIONS

Stancu, C. et al., "Separately Excited Synchronous Motor With Rotary Transformer for Hybrid Vehicle Application", IEEE Transactions on Industry Applications, vol. 54, No. 1, Jan./Feb. 2018, pp. 223-232.

(Continued)

*Primary Examiner* — Shawki S Ismail
*Assistant Examiner* — Kazi S Hossain
(74) *Attorney, Agent, or Firm* — Warner Norcross + Judd LLP

(57) ABSTRACT

A system is provided for transferring power between a stator and a rotor of an excitation system. The stator and the rotor may form part of a rotary transformer that includes a primary winding and a secondary winding, where power is transferred from the primary winding to the secondary winding or conversely from the secondary winding to the primary winding.

20 Claims, 17 Drawing Sheets

(56) References Cited

U.S. PATENT DOCUMENTS

| | | | |
|---|---|---|---|
| 2018/0269770 A1* | 9/2018 | Powell | H02K 1/246 |
| 2019/0190276 A1* | 6/2019 | Liu | H02J 3/46 |
| 2020/0373056 A1* | 11/2020 | Sanchihar | H01F 27/02 |
| 2021/0010604 A1* | 1/2021 | Murakami | F01P 7/16 |

OTHER PUBLICATIONS

Krupp, H. et al., "Rotary Transformer Design for Brushless Electrically Excited Synchronous Machines", 2015 IEEE Vehicle Power and Propulsion Conference (VPPC), Oct. 19-22, 2015, pp. 1-6.

Illiano, E. M., "Design of a highly efficient brushless current excited synchronous motor for automotive purposes", PhD Thesis, ETH Zurich, 2014, available at https://doi.org/10.3929/ethz-a-010433793, pp. 1-212.

Raminosoa, T. et al., "Contactless Rotor Excitation for Traction Motors", 2018 IEEE Energy Conversion Congress and Exposition (ECCE), pp. 6448-6453.

Haruna, J. et al., "Stability Analysis and Control of a Rotary Transformer-Based Synchronous Motor Field Excitation System", 2019 IEEE Transportation Electrification Conference and Expo (ITECP, pp. 1655-1662.

Haruna, J. et al., "Modeling and Steady-State Analysis of a Rotary Transformer-Based Field Excitation System for Wound Rotor Synchronous Machine", pp. 1-8, 2019 IEEE conference.

Haruna, J. et al., "Enhanced Rotary Transformer-Based Field Excitation System for Wound Rotor Synchronous Motor", 2019 IEEE Energy Conversion Congress and Exposition (ECCE), pp. 1166-1173.

\* cited by examiner

WIRELESS EXCITATION SYSTEM

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF INVENTION

The present disclosure relates to the field of wireless power transfer systems, also described as wireless energy transfer systems, and more particularly toward a rotary transformer capable of wireless power transfer.

BACKGROUND

Conventional excitation systems for rotors of electric machines use slip rings and brushes. However, slip rings are subjected to wear due to mechanical friction with the brushes, and therefore they have reliability issues, limited lifetime, and often involve frequent maintenance. Accordingly, conventional excitations systems are not considered suitable for high speed applications.

Another conventional excitation system avoids slip rings by using one additional electric machine featuring rotating diodes called an exciter to power the rotor winding of the main machine. Often, the DC excitation of the exciter itself is provided by a permanent magnet generator. These conventional additional electric machines are complex, costly, heavy and bulky for an embarked system (vehicles, or aircrafts).

Conventional rotary transformers have been used to transfer power to the rotor winding in a contactless manner. However, conventional rotary transformer topologies have small airgaps, and therefore are not suitable for high speed applications unless costly high precision manufacturing methods are used.

SUMMARY

In general, one innovative aspect of the subject matter described herein is an excitation system may include a rotary transformer including: a stator that includes a primary winding and a primary ferromagnetic-material core; a shaft configured to rotate relative to the stator during operation of the rotary transformer; a rotor affixed to the shaft to rotate along with the shaft while being spaced apart from the stator by a predetermined gap. The rotor may include a secondary winding. The rotary transformer may include a rotor support affixed to the rotor and configured to encapsulate the rotor, at least a portion of the rotor support being disposed between the primary winding and the secondary winding. The system may include a primary compensation circuit electrically coupled with the primary winding of the stator, where the primary compensation circuit is configured to be in resonance with the primary winding, where the primary winding and the secondary winding have one of radial overlap or axial overlap.

The foregoing and other embodiments can each optionally include one or more of the following features, alone or in combination. In particular, one embodiment includes all the following features in combination.

In some embodiments, the excitation system may include a secondary compensation circuit electrically coupled with the second winding of the rotor and mechanically coupled with the rotor to rotate along with the rotor, where the secondary compensation circuit is configured to be in resonance with the secondary winding.

In some embodiments, an excitation system may include first and second windings have radial overlap, and the rotor support encapsulates the secondary winding.

In some embodiments, an excitation system may include the rotor with a secondary ferromagnetic-material core, and the rotor support may further encapsulate the secondary ferromagnetic-material core.

In some embodiments, the excitation system may include multiple rotary transformers for multiple phases configured according to the rotary transformer.

In some embodiments, an excitation system may include the rotor with ferromagnetic material arranged to confine flux lines, and where the rotor support may further encapsulate the ferromagnetic material.

In some embodiments, an excitation system may include the shaft, the stator, and the rotor disposed relative to each other in an axial-flux configuration.

In some embodiments, an excitation system may include first and second windings being axially overlapped, and where the rotor support encapsulates the secondary winding.

In some embodiments, the excitation system may include multiple rotary transformers for multiple phases configured according to the rotary transformer.

In some embodiments, an excitation system may include the rotor with a secondary ferromagnetic-material core, and where the rotor support encapsulates the secondary ferromagnetic-material core.

In some embodiments, an excitation system may include the rotor with ferromagnetic material arranged to confine flux lines, and where the rotor support encapsulates the ferromagnetic material.

In some embodiments, the excitation system may include multiple rotary transformers for multiple phases configured according to the rotary transformer.

In some embodiments, an excitation system may include the shaft, the stator, and the rotor disposed relative to each other in a radial-flux configuration.

In some embodiments, an excitation system may include the ferromagnetic material with one or more of ferrite, soft magnetic composite, or laminated electrical steel.

In some embodiments, an excitation system may include the rotor support with mechanically strong, non-conductive and non-magnetic material.

In some embodiments, an excitation system may include the rotor support material with composite materials based on glass fiber or carbon fiber, G11, BMI, Thermoplastic, ceramic, and/or cermet.

In some embodiments, an excitation system may include the shaft with metallic material.

In some embodiments, an excitation system may include the shaft with non-conductive material.

In some embodiments, an excitation system may include the shaft material being non-magnetic.

In some embodiments, an excitation system may include the predetermined gap being sufficiently large, so the rotary transformer is capable of high-speed operation.

In some embodiments, an excitation system may include the primary compensation circuit being configured as one of a series circuit, an LCL circuit, or an LCC circuit.

In some embodiments, an excitation system may include the secondary compensation circuit being configured as one of a series circuit, a parallel circuit, an LCL circuit, or an LCC circuit.

In some embodiments, an excitation system may include each of the primary compensation circuit and the secondary compensation circuit being configured as an LCC circuit.

In some embodiments, an excitation system may include each of the primary compensation circuit and the secondary compensation circuit being configured as an LCL circuit.

In some embodiments, an excitation system may include each of the primary compensation circuit and the secondary compensation circuit being configured as a series circuit.

In some embodiments, an excitation system may include the primary compensation circuit being configured as a series circuit.

In some embodiments, an excitation system may include the primary compensation circuit being configured as an LCC circuit.

In some embodiments, an excitation system may include the primary compensation circuit being configured as an LCL circuit.

In some embodiments, the excitation system may include a DC bus and an inverter electrically coupled between the DC bus and the primary compensation circuit.

In some embodiments, the excitation system may include a motor-field winding, and a rectifier electrically coupled between the secondary compensation circuit and the motor-field winding, where the rectifier and the motor-field winding are mechanically coupled with the rotor to rotate along with the rotor.

In general, one innovative aspect of the subject matter described herein can include an excitation system that may include a rotary transformer. The rotary transformer may include a stator that with a primary winding and a primary ferromagnetic-material core, a shaft configured to rotate relative to the stator during operation of the rotary transformer, a rotor affixed to the shaft to rotate along with the shaft while being spaced apart from the stator by a predetermined gap. The rotor may include a secondary winding that has radial overlap or axial overlap with the primary winding, where the shaft, the stator, and the rotor are disposed relative to each other in a radial-flux configuration. The rotary transformer may include a rotor support affixed to the rotor and configured to encapsulate the rotor, where at least a portion of the rotor support is disposed between the primary winding and the secondary winding. The system may include a primary compensation circuit electrically coupled with the primary winding of the stator, where the primary compensation circuit may be configured to be in resonance with the primary winding.

The foregoing and other embodiments can each optionally include one or more of the following features, alone or in combination. In particular, one embodiment includes all the following features in combination.

In some embodiments, the excitation system may include a secondary compensation circuit electrically coupled with the secondary winding of the rotor and mechanically coupled with the rotor to rotate along with the rotor, where the secondary compensation circuit is configured to be in resonance with the secondary winding.

In some embodiments, an excitation system may include a rotor with ferromagnetic material arranged to confine flux lines, and where the rotor support encapsulates the ferromagnetic material.

In general, one innovative aspect of the subject matter described herein is an excitation system that may include a rotary transformer. The rotary transformer may include: a stator that includes a primary winding and a primary ferromagnetic-material core, a shaft configured to rotate relative to the stator during operation of the rotary transformer, a rotor affixed to the shaft to rotate along with the shaft while being spaced apart from the stator by a predetermined gap. The rotor may include a secondary winding that has radial overlap or axial overlap with the primary winding, where the shaft, the stator, and the rotor are disposed relative to each other in an axial-flux configuration. The rotor support may be affixed to the rotor and configured to encapsulate the rotor, where at least a portion of the rotor support is disposed between the primary winding and the secondary winding. The system may include a primary compensation circuit electrically coupled with the primary winding of the stator of at least one of the multiple rotary transformers, where the primary compensation circuit is configured to be in resonance with the primary winding. The rotor further may include ferromagnetic material arranged to confine flux lines, and the rotor support may encapsulate the ferromagnetic material.

The foregoing and other embodiments can each optionally include one or more of the following features, alone or in combination. In particular, one embodiment includes all the following features in combination.

In some embodiments, the excitation system may include a secondary compensation circuit that is electrically coupled with the second winding of the rotor and mechanically coupled with the rotor to rotate along with the rotor, and where the secondary compensation circuit is configured to be in resonance with the secondary winding.

In some embodiments, the excitation system may include multiple rotary transformers configured according to the rotary transformer.

In general, one innovative aspect of the subject matter described herein is an excitation system that may include multiple rotary transformers. Each rotary transformer may include: a stator that includes a primary winding and a primary ferromagnetic-material core, a shaft configured to rotate relative to the stator during operation of the rotary transformer, a rotor affixed to the shaft to rotate along with the shaft while being spaced apart from the stator by a predetermined gap. The rotor may include a secondary winding that has radial overlap or axial overlap with the primary winding, where the shaft, the stator, and the rotor are disposed relative to each other in an axial-flux configuration, a rotor support affixed to the rotor and configured to encapsulate the rotor, and where at least a portion of the rotor support is disposed within the predetermined gap between the primary winding and the secondary winding or between surfaces of the stator, or both. The system may include a primary compensation circuit electrically coupled with the primary winding of the stator of at least one of the multiple rotary transformers, the primary compensation circuit configured to be in resonance with the primary winding.

The foregoing and other embodiments can each optionally include one or more of the following features, alone or in combination. In particular, one embodiment includes all the following features in combination.

In some embodiments, the excitation system may include a secondary compensation circuit electrically coupled with the secondary winding of the rotor of at least one of the multiple rotary transformers and mechanically coupled with the rotor to rotate along with the rotor, where the secondary compensation circuit is configured to be in resonance with the secondary winding.

In some embodiments, a synchronous motor may comprise the excitation system.

In some embodiments, a synchronous generator may comprise the excitation system.

In general, one innovative aspect of the subject matter described herein is an excitation system that includes a rotary transformer. The rotary transformer may include: a stator that with a primary winding; a shaft configured to rotate relative to the stator during operation of the rotary transformer; a rotor affixed to the shaft to rotate along with the shaft. The rotor may include a secondary winding operably spaced apart from the primary winding by a gap. The rotor support may be affixed to the rotor, where at least a portion of the rotor support is disposed within the gap between the primary winding and the secondary winding. The system may include a primary compensation circuit electrically coupled with the primary winding of the stator, where the primary compensation circuit is configured to be in resonance with the primary winding, and where the primary winding and the secondary winding have one of radial overlap or axial overlap.

The foregoing and other embodiments can each optionally include one or more of the following features, alone or in combination. In particular, one embodiment includes all the following features in combination.

In some embodiments, an excitation system may include the rotor support covering an entire exterior surface of the rotor, and where the shaft extends through an interior aperture of the rotor.

In some embodiments, an excitation system may include the rotor support encapsulating the rotor, and where the shaft contacts the rotor support.

In some embodiments, an excitation system may include the gap being predetermined.

In some embodiments, an excitation system may include the gap being 7 mm or greater.

In some embodiments, an excitation system may include the gap being approximately 7.6 mm.

In some embodiments, an excitation system may include the stator with a primary ferromagnetic-material core.

In some embodiments, the excitation system may include a secondary compensation circuit electrically coupled with the second winding of the rotor and mechanically coupled with the rotor to rotate along with the rotor, and where the secondary compensation circuit is configured to be in resonance with the secondary winding.

In some embodiments, an excitation system may include the rotor with a secondary ferromagnetic-material core, and where the rotor support may encapsulate the secondary ferromagnetic-material core.

In some embodiments, an excitation system may include the first and second windings being axially overlapping and the rotor support encapsulating the secondary winding.

In some embodiments, an excitation system may include the first and second windings being radially overlapping and the rotor support encapsulating the secondary winding.

In some embodiments, an excitation system may include the rotor support being non-conductive and non-magnetic material.

In some embodiments, an excitation system may include the rotor support being operable to maintain a position of the secondary winding relative to the primary winding at RPM greater than 10,000.

In some embodiments, an excitation system may include the primary include first and second portions spaced apart to define a stator gap, wherein the gap is defined at least in part by the stator gap.

In some embodiments, an excitation system may include the secondary winding and a portion of the rotor support being disposed in the stator gap.

In general, one innovative aspect of the subject matter described herein is a wireless power system that may include a stator having a first winding and a rotor having a second winding operably spaced apart from the first winding by a gap, the rotor operable to rotate relative to the stator. The wireless power system may include a rotor support affixed to the rotor, with at least a portion of the rotor support being disposed within the gap between first winding and the second winding. The wireless power system may include a shaft coupled to the rotor, where the shaft may be configured to rotate relative to the stator in conjunction with the rotor. The wireless power system may include a first compensation circuit electrically coupled with the first winding of the stator, where the first compensation circuit is configured to be in resonance with the first winding.

The foregoing and other embodiments can each optionally include one or more of the following features, alone or in combination. In particular, one embodiment includes all the following features in combination.

In some embodiments, a wireless power system may include the second winding being configured to transfer power to the first winding in response to rotation of the rotor, such that the stator and rotor operate as an electrical generator.

In some embodiments, a wireless power system may include the second winding being configured to facilitate rotation of the rotor in response to receipt of power from the first winding, such that the stator and rotor operate as an electric motor.

In some embodiments, a wireless power system may include the first and second windings being arranged to be one of radially overlapping or axially overlapping.

In some embodiments, a wireless power system may include the rotor support covering an entire exterior surface of the rotor and where the shaft extends through an interior aperture of the rotor.

In some embodiments, a wireless power system may include the rotor support encapsulating the rotor, and where the shaft contacts the rotor support.

In some embodiments, a wireless power system may be configured such that the gap is predetermined.

In some embodiments, a wireless power system may be configured such that the gap is approximately 7.6 mm.

In some embodiments, an excitation system may be configured such that the stator includes a primary ferromagnetic-material core.

In some embodiments, the excitation system may include a secondary compensation circuit electrically coupled with the second winding of the rotor and mechanically coupled with the rotor to rotate along with the rotor, and where the secondary compensation circuit is configured to be in resonance with the secondary winding.

In some embodiments, an excitation system may be configured such that the rotor includes a secondary ferromagnetic-material core and the rotor support encapsulates the secondary ferromagnetic-material core.

In some embodiments, an excitation system may be configured such that the first and second windings are axially overlapping and the rotor support encapsulates the secondary winding.

In some embodiments, an excitation system may be configured such that the first and second windings are radially overlapping and the rotor support encapsulates the secondary winding.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Figure 1:
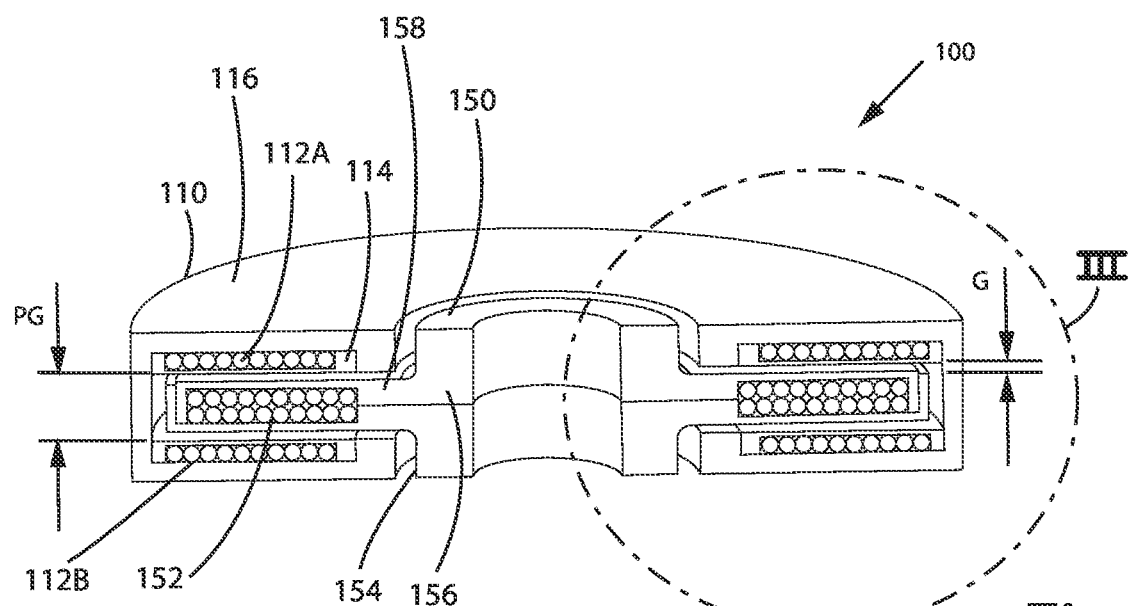
FIG. 1 shows a rotary transformer in accordance with one embodiment.

In one embodiment, a system is provided for transferring power between a stator and a rotor of an excitation system. The stator and the rotor may form part of a rotary transformer that includes a primary winding and a secondary winding, where power is transferred from the primary winding to the secondary winding or conversely from the secondary winding to the primary winding. The power received by one of the secondary and primary windings may be used to provide motive force to the rotor with respect to the stator (e.g., to generate torque on a shaft coupled to the rotor. Alternatively, the power received by one of the secondary and primary windings may be used to provide power to an external load, such as in the case of the excitation system operating as a generator to translate mechanical energy supplied to the rotor into electrical power output from the stator.

The rotary transformer-based excitation system in accordance with one embodiment may allow reliable excitation of rotors of synchronous motors or generators.

A contactless excitation system in accordance with one embodiment may enable the adoption of non-permanent magnet—thus non-rare-earth—motor technologies, such as synchronous motors or generators and doubly-fed induction motors or generators. Such material may also avoid induced eddy current losses.

As described herein, a stator gap and/or a gap between a primary and a secondary winding may be provided. One or both gaps may enhance safe operation at high operating speeds. One or both gaps may also facilitate taking advantage of resonant compensation to significantly increase power transfer capability. The size of the gap may be application specific and may be selected based on the power to be transferred, size of the system, and operating speed.

In one embodiment, the rotary transformer may enhance safe operation at high speeds due at least in part to an effective retainment of a rotating part by use of high strength lightweight non-magnetic and non-conductive material (composite material for example).

Several embodiments are directed to large airgap rotary transformer topologies and are disclosed herein to provide options for integration of the excitation system into a larger system.

Several embodiments of resonant compensation circuits are disclosed to increase the power transfer capability and to provide options for any particularity of the application. The resonant compensation may be used to significantly increase power transfer capability despite an increase in airgap. The resonant compensation may simplify and stabilize the control of the field current.

In one embodiment, the rotary transformer may be incorporated into a three phase configuration to allow or enhance reliable excitation of doubly-fed induction motors or generators and able to operate at extremely high speed.

In one embodiment, multiphase configurations are provided and allow operation with a high pulse multiphase rectifier to provide low ripple DC excitation current.

Effective retention of the rotating part may be achieved by using high strength lightweight non-magnetic and non-conductive material (composite material for example).

A rotary transformer in accordance with one embodiment may enable wireless and contactless power transfer to rotating components of a system, such as the rotor of a wound field synchronous motor. Use of the rotary transformer in the field excitation of a synchronous motor for an electric vehicle and similar applications may potentially avoid 1) conventional slip rings-brushes arrangements that involve frequent maintenance; 2) significant friction losses at high speed; 3) contact cooling issues; 4) increased overall motor weight and size; and 5) reduced reliability and life. The rotary transformer in one embodiment may be series-series compensated with a transmitter coil (e.g., a primary winding) supplied from a single-phase inverter, and a receiver coil (e.g., a secondary winding) connected to a full bridge diode rectifier that feeds the rotor field winding. Harmonic balancing may be used to obtain a complex variable dynamic model of the system. Using this model and the concept of the bimatrix, the controllability and observability of the rotary transformer can be analyzed for different output variables. The controllability and observability matrices in one embodiment are not of full rank indicating the existence of states which are unaffected by the control input. The concept of zero dynamics of the system may be used to determine these states and the condition for the stability of the zero dynamics can be determined.

A rotary transformer may be conceptualized as an inductive wireless power transfer (IWPT) system with one-half of its electrical circuit free to rotate with respect to the other half. The rotary transformer in accordance with one embodiment may involve rotor winding excitation of an electric motor for an electric vehicle (EV) and similar applications. This configuration may avoid physical contact and eliminate or substantially eliminate friction caused by wear and tear and related maintenance relative to a conventional slip ring brushes arrangement for wound rotor synchronous motors. The rotary transformer-based configuration may also operate in harsh environments and may utilize less space and less torque for operation relative to conventional configurations. For instance, the rotary transformer may be able to operate at high-speed and under high vibration environments without producing friction power losses. However, in conventional rotary transformer configurations, heavy ferrite cores and a small airgap of less than 0.5 mm are provided in an effort to maximize the coupling between the primary and secondary windings, thereby limiting the operating speed relative to component precision.

In one embodiment according to the present disclosure, compensation circuitry may be incorporated into the rotary transformer, including for instance a resonant series compensation circuit on a primary side of the rotary transformer, or a resonant series compensation circuit on both the primary and secondary sides of the rotary transformer.

In a rotary transformer, the relative rotation between the primary and secondary sides in their respective windings may prevent the rotation from interfering with the mutual coupling between the two windings. In other words, the rotary transformer may not include motion induced back electromotive force in the windings.

FIGS. 1-2 and 6-7 depict several embodiments of a rotary transformer incorporated into a field excitation system 10, such as a wound rotor synchronous motor (WRSM). The rotary transformer in accordance with one embodiment may include interleaved primary and secondary windings and a large magnetic airgap that enables transfer of power with resonant compensation circuits. The rotary transformer in accordance with one embodiment may have reduced leakage inductance compared to other applications of inductive wireless power transfer (e.g., EV battery charging). A variety of compensation circuit configurations are described herein, including series-series, series-parallel, parallel-series, parallel-parallel, and other higher order compensation circuits, or any combination thereof. For purposes of disclosure, several embodiments are described in conjunction with the series-series compensation circuit configurations (e.g., primary compensation circuitry 174-1 and secondary compensation circuitry 176-3). The series-series compensation configuration has a high part load efficiency and can be beneficial where there is no or little concern about no-load voltage regulation as in the case of the field excitation of a synchronous motor.

Figure 4:
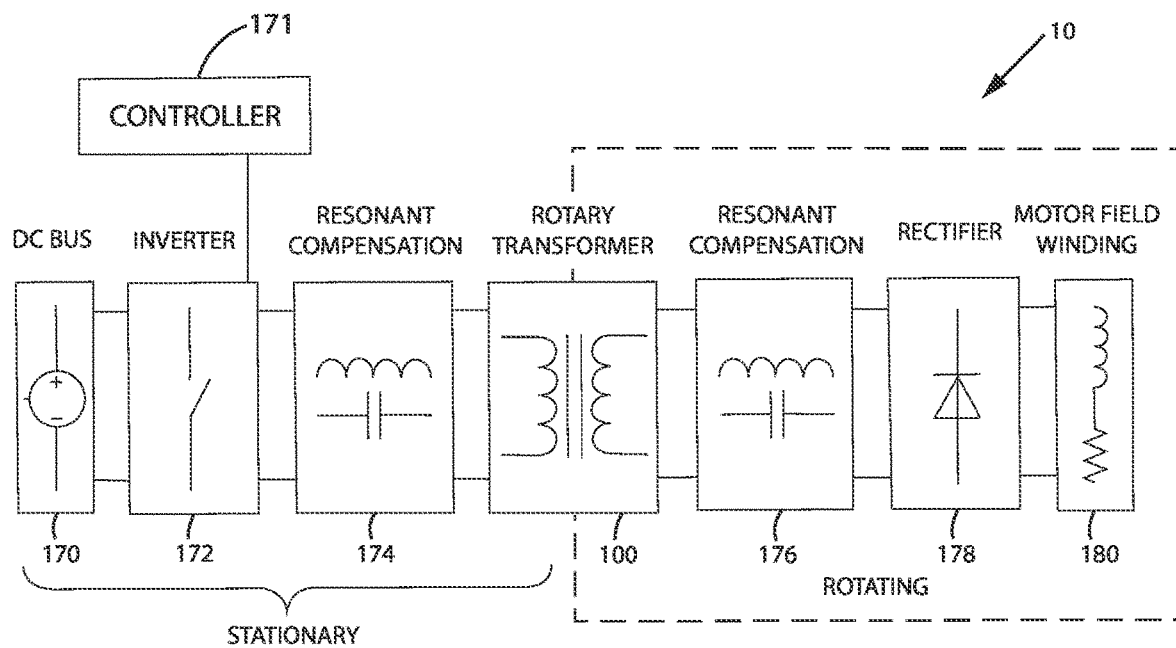
FIG. 4 depicts a representative schematic of a system in accordance with one embodiment.
Figure 5:
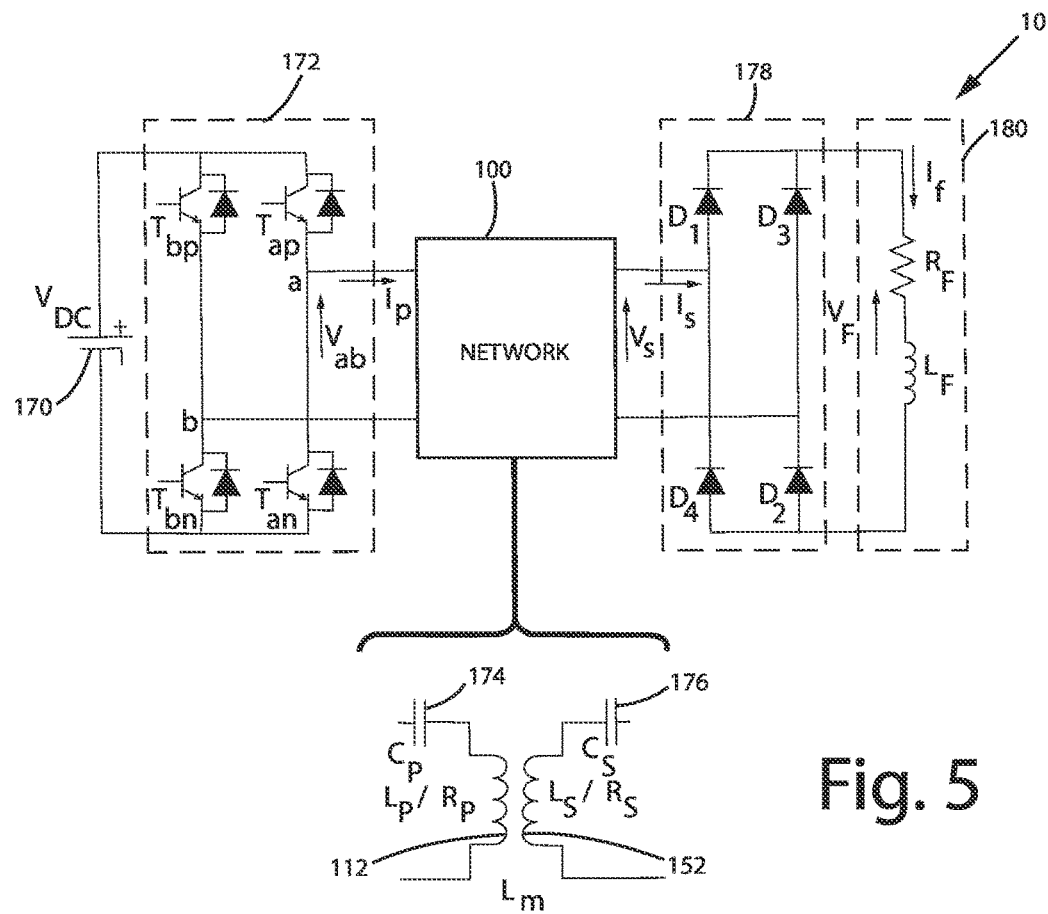
FIG. 5 shows a representative schematic of a system in accordance with one embodiment.

The detailed circuit diagram of a field excitation system 10 in accordance with one embodiment with a rotary transformer is shown in FIGS. 4 and 5 with a series-series compensation configuration. The system 10 includes an inverter 172 (e.g., a single-phase inverter) supplied from a DC source 170 to provide power for the primary coil 112 of the rotary transformer 100, series-series compensating capacitors 174, 176, rectification circuitry 178 (e.g., a full bridge diode rectifier) to which the receiver coil 152 is connected. The output of the rectification circuitry 178 is connected to the field winding 180 of the synchronous motor. Due at least in part to high non-linearity of the system 10 of FIGS. 4-5, a dynamic model of the system 100, from which an equilibrium point of operation can be determined, may be based on a harmonic balance technique. As the harmonic balance technique establishes the dynamic relationships between the phasor values of system variables, at the equilibrium point of operation, the time derivative of these phasor values can be set to zero (in other words, the phasor values are constant at the equilibrium point of operation). This enables the calculation of the peak values of system variables at equilibrium. Furthermore, the state matrix and input matrix of the system 10 for small signal analysis are determined by linearization. For various choices of output variables, the observation matrix can also be determined. Controllability, observability and stability can then be applied using these matrices to check the controllability, observability and stability of the field excitation system 10. It is shown for different controlled output variables that the field excitation system 10 includes internal dynamics that are substantially unaffected by the control input variable. The internal dynamics for various choices of the output variables have been determined and by the concept of the zero dynamics the conditions for the stability of the field excitation system can be established. The zero dynamics may be identified as internal dynamics of the system when the control input variable is such that the controlled output variable is forced to a zero value.

As the harmonic balance technique used for modeling results in a complex variable dynamic model of the system, the concept of a bimatrix can be used for the controllability and observability.

There are several control schemes and methodologies that can be used for controlling the IWPT systems 10. These control schemes may assume the stability of the system, without stating or showing why the system should be stable. The stability conditions in the IWPT system 100, particularly the rotary transformer based IWPT system 10, for different choices of controlled output variable may be determined based on a harmonic balance technique. It is to be understood, however, that alternative techniques may be used.

I. Overview

Figure 2:
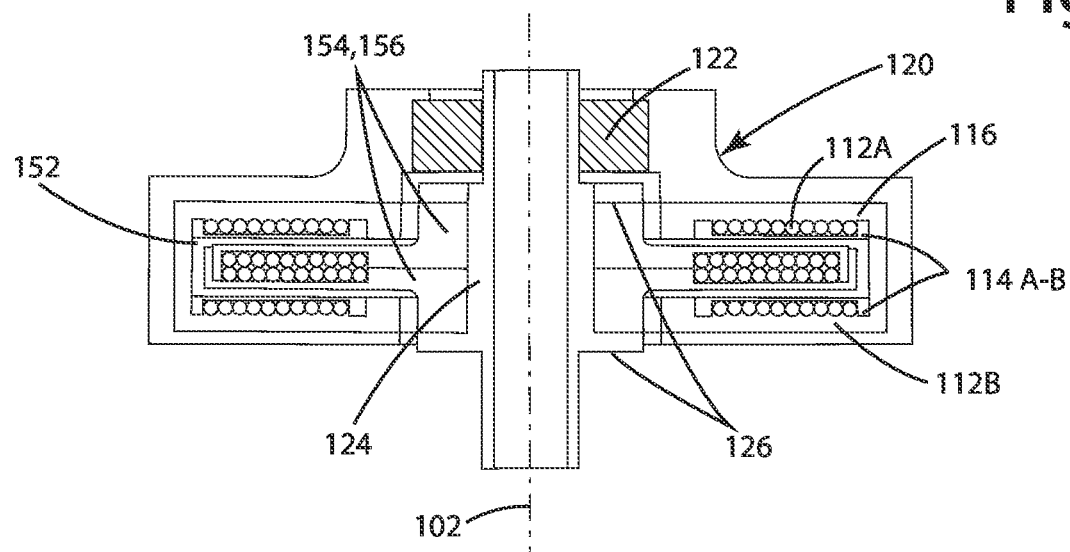
FIG. 2 shows a sectional view of FIG. 1
Figure 3:
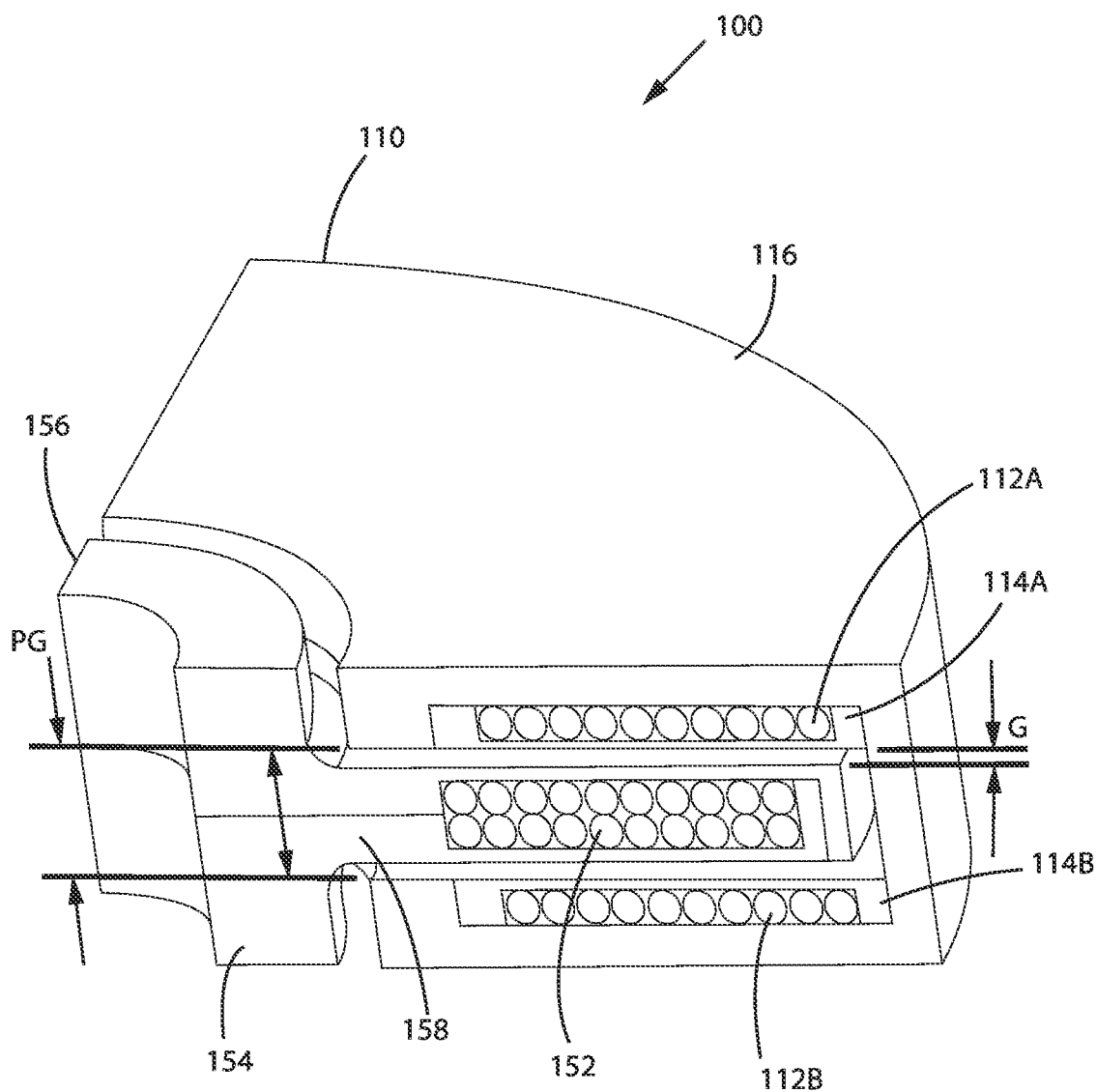
FIG. 3 shows a sectional, a larger view of FIG. 1.

An excitation system 10 in accordance with one embodiment is shown in FIGS. 1-3 including a rotary transformer 100. The rotary transformer 100 may include a stator 110 having a primary winding 112 and a primary ferromagnetic core 116. The rotary transformer 100 may include a shaft 124 configured to rotate relative to the stator 110 during operation, and a rotor 150 affixed to the shaft 124 that may rotate along with the shaft 124 during operation. In the illustrated embodiment, the rotor 150, the shaft 124, and the stator 110 rotate about a central or primary axis 102. In the illustrated embodiments, the rotary transformer 100 includes a primary winding 112 provided in more than one parts that are spaced apart, e.g., with first and second primary windings designated 112A, 112B supported by first and second supports 114A, 114B. As described herein, the primary winding 112 may be a single part that is spaced apart from a secondary winding 158.

The rotor 150 may be spaced apart from the stator 110 by a gap G (which may be a predetermined airgap), and may include a secondary winding 152 operable to receive power from (or transmit power to) the primary winding 112. The size of the gap G may vary from application to application, and may for instance be 7 mm or greater, or 7.6 mm or greater. The primary winding 112 in one embodiment may include first and second portions spaced apart, where the gap G is defined at least in part by the spacing between the first and second portions of the primary winding 112.

The secondary winding 152 and a portion of the rotor support 158 may be disposed in a stator gap PG defined between internal opposing surfaces of the stator 110. In the illustrated embodiment, the stator gap PG is defined between opposing surfaces of the first and second supports 114A, 114B. The stator gap PG may be absent in one or more embodiments as described herein. The stator gap PG in one embodiment may be 15 mm or greater, or 15.3 mm or greater. The stator gap PG and/or the gap G may be sufficiently large, so the rotary transformer is capable of high-speed operation, including, for example, operation equal to or greater than 8,000 RPM, equal to or greater than 10,000 RPM, equal to or greater than 16,000 RPM, equal to or greater than 20,000 RPM, equal to or greater than 25,000 RPM, approximately equal to 30,000 RPM, between 8,000 RPM and 12,000 RPM, between 10,000 RPM and 16,000 RPM, between 10,000 RPM and 20,000 RPM, or between 8,000 RPM and 30,000 RPM.

The rotor 150 may include first and second supports 154, 156, which may be composite plates in one embodiment operable to maintain a position of the secondary winding 152 relative to the gap G and the stator gap PG. In the illustrated embodiment, the first and second supports 154, 156 may interface with the shaft 124, and may be sandwiched between support plates 126 (e.g., stainless steel plates) to maintain a position relative to the shaft 124. At least one bearing 122 may be disposed on the shaft 124 to facilitate maintaining a position of the rotor 150 and shaft 124 relative to the stator 110. A housing 120 (e.g., an aluminum housing) may be provided to enclose the rotor 150 and the stator 110. The at least one bearing 122 may interface with the housing 120 and/or the support plates 126 to facilitate maintaining the position of the rotor 150 and the shaft 124 relative to the stator 110.

A rotor support 158 may be affixed to the rotor and configured to encapsulate all or a portion of the rotor 150. At least a portion of the rotor support 158 may be disposed within the stator gap PG of the stator 110. As an example, the rotor support 158 may cover an entire exterior surface of the rotor 150, where the shaft 124 may extend through an interior aperture of the rotor 150. As another example, the rotor support 158 may encapsulate the rotor 150, and where the shaft 124 contacts the rotor support 158.

The rotor support 158 in one embodiment may be a nonconductive and nonmagnetic material. The rotor support 158 may be operable to maintain a position of the secondary winding 152 relative to the primary winding 112 at high-speed, such as RPMs greater than 10,000. The material used for the rotor support 158 may vary from application to application, including composite materials based on glass fiber or carbon fiber, G11, BME, thermoplastic, ceramic, and/or cermet. The construction of the rotor support 158 may provide a mechanically strong, nonconductive and nonmagnetic material in one embodiment to facilitate high-speed operation.

The shaft 124 may vary in construction from application to application. For instance, the shaft 124 may be metallic material (e.g., stainless steel) in one embodiment, whereas in another embodiment, the shaft 124 may be nonconductive material. As another example, the shaft 124 may be non-magnetic in addition to or alternative to being a metallic material or a nonconductive material.

The excitation system may include a primary compensation circuit 174 that is electrically coupled to the primary winding 112 of the stator 110. The primary compensation circuit 174 may be configured to be in residence with the primary winding 112. The excitation system may also include a secondary compensation circuit 176 electrically coupled with the secondary winding 152 of the rotor 150. The secondary compensation circuit 176 may be mechanically coupled with the rotor 150 to rotate along with the rotor 150, and where the secondary compensation circuit 176 is configured to be in resonance with the secondary winding 150.

In one embodiment, the rotor 150 may include a secondary ferromagnetic core 368, where the rotor support 158 may encapsulate the secondary ferromagnetic core 368. The secondary ferromagnetic core 368 may be arranged to confine flux lines generated by the primary winding 112 or to guide the flux to reduce fringing.

The primary ferromagnetic core and/or the secondary ferromagnetic core 368 may be one or more of ferrite, soft magnetic composite, or laminated electric steel.

In one embodiment, the primary winding 112 and the secondary winding 152 may be arranged in a radial overlapping configuration or an axial overlapping configuration. As an example, in a radial or axial overlapping configuration, the shaft 124, the stator 110, and the rotor 150 are disposed relative to each other in an axial flux configuration. As another example, in the radial or axial overlapping configuration, the shaft 124, the stator 110, and the rotor 150 may be disposed relative to each other in a radial-flux configuration.

The construction of the primary winding 112 and/or the secondary winding 152 may vary from application to application. In the illustrated embodiment, the primary winding 112 and the secondary winding 152 are constructed from potted Litz wire. The primary winding 112 and/or the secondary winding 152 may be supported by a support 114 (e.g., a composite wedge) relative to the primary ferromagnetic core 116 and the secondary ferromagnetic core 368, respectively.

In one embodiment the excitation system may include multiple rotary transformers, each configured in accordance with one or more embodiments described herein.

The excitation system in the illustrated embodiment of FIGS. 1, 4, and 5 may include a DC bus 170, an inverter 172, a rectifier 178 and a motor field winding 180, in addition to the primary compensation circuitry 174, the rotary transformer 100, and the secondary compensation circuitry 176. The DC bus 170 may be operably coupled to a power source to deliver power to an inverter 172 that is operable to selectively power the primary compensation circuitry 174 and the primary winding 112.

In the illustrated embodiment, the motor field winding 180 is coupled to the rectifier 178, which receives power from the secondary winding 158 of the rotary transformer 100 and the secondary resident compensation circuitry 176. The rectifier 178 in the motor field winding 180 may be mechanically coupled with the rotor 150 to rotate along with the rotor 150 and operation.

As described herein, the primary compensation circuitry 174 and the secondary compensation circuitry 176 may vary from application to application. As an example, the primary compensation circuitry 174 or the secondary compensation circuitry 176, or both, may be configured as an LCC circuit, an LCL circuit, a series circuit, parallel circuit, or a direct connection, or any combination thereof. Various circuit topologies for the rotary transformer 100 are shown in the illustrated embodiment of FIGS. 23-31, with the various portions of circuitry for each circuit topology being identified by hyphenated reference numbers to indicate associated circuit configurations. For instance, the primary compensation circuitry 174 in the illustrated embodiment of FIG. 1 may take several forms as identified as 174-1 -2 -3 in the illustrated embodiments of FIGS. 23-31.

Figure 30:
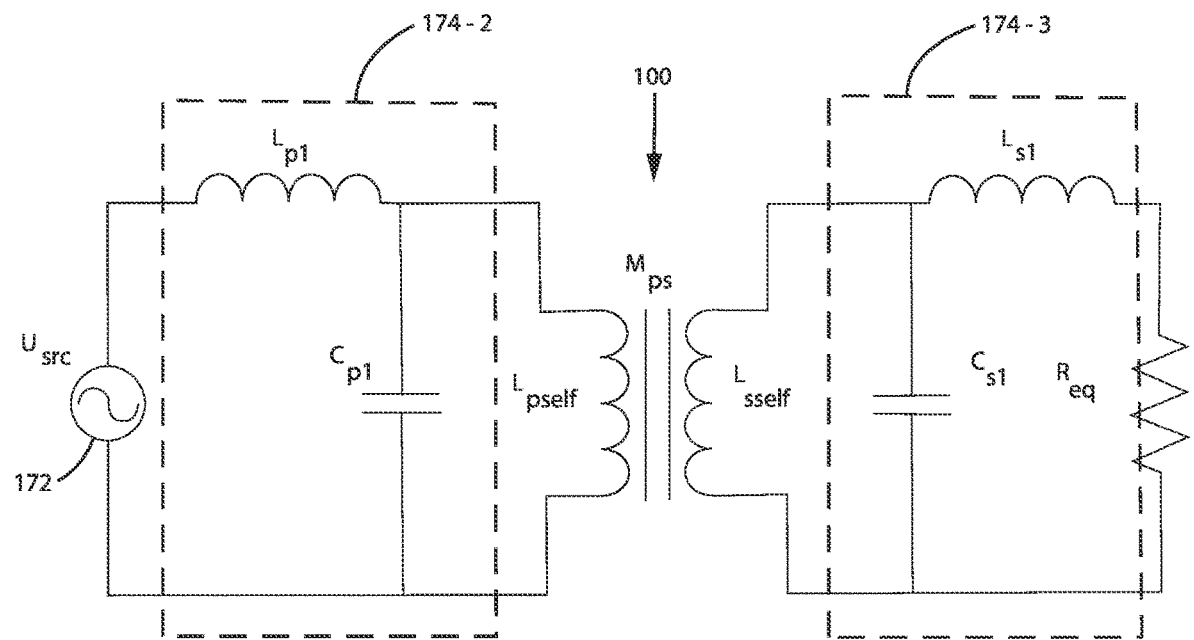
FIG. 30 depicts a representative circuit of a system in accordance with one embodiment.
Figure 31:
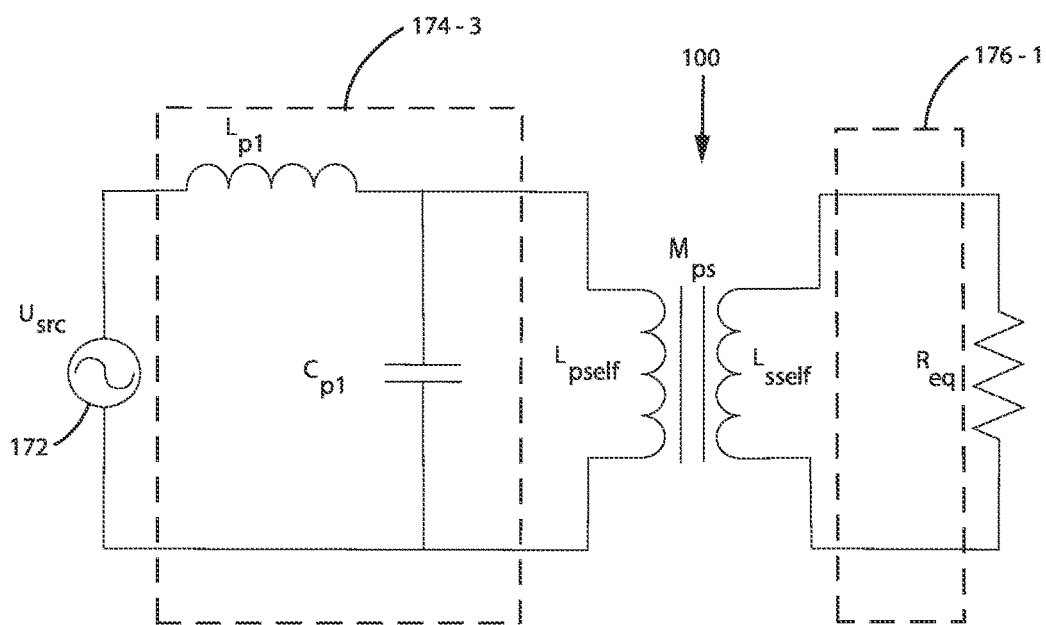
FIG. 31 depicts a representative circuit of a system in accordance with one embodiment.

As an example, in the illustrated embodiment of FIG. 30, primary compensation circuitry 174-2 and secondary compensation circuitry 176-3 are depicted with LCC circuit configurations for both sets of circuitry. This configuration may be considered a double sided LCC case, and it is noted that the impedance of any one of the capacitors or inductors can be set equal to zero or substantially zero to yield a different resident network, which can provide unity power factor input.

Figure 32:
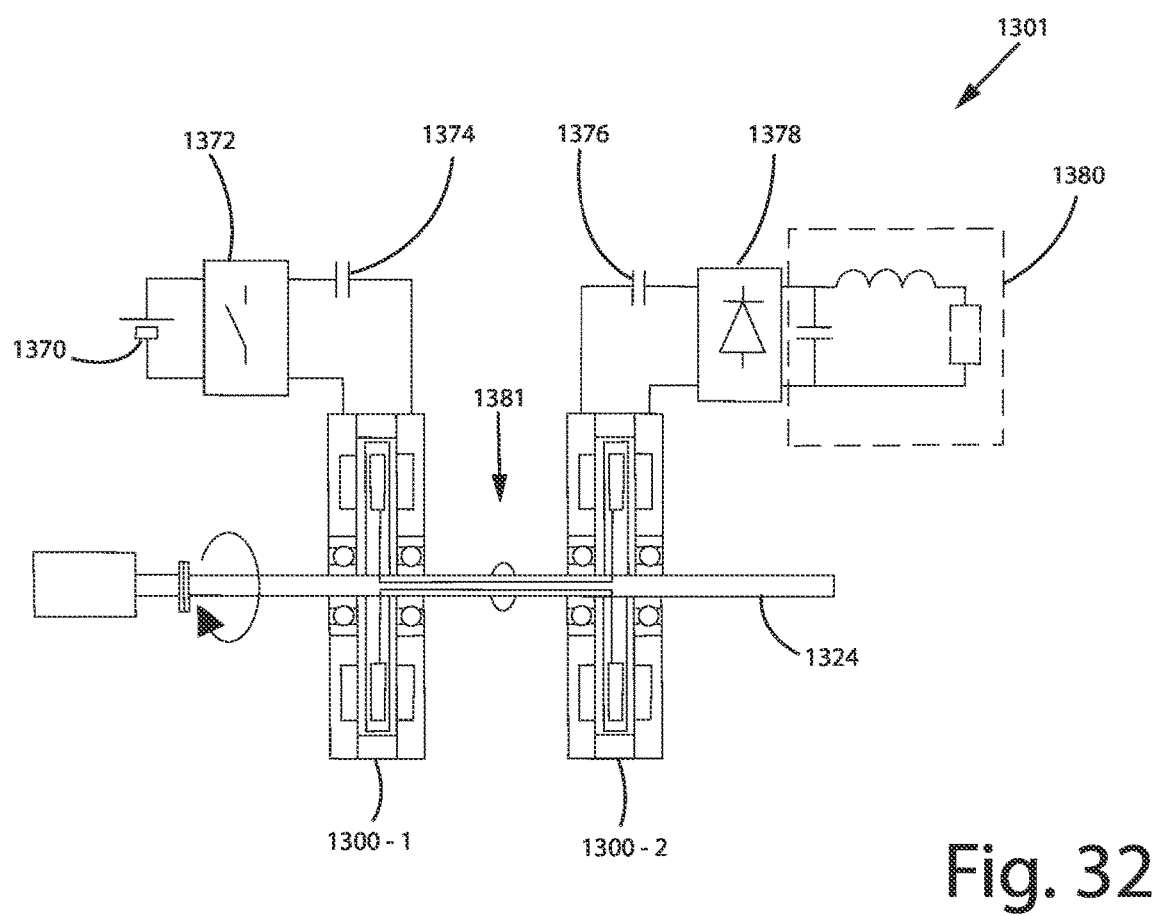
FIG. 32 shows a representative view of a system in accordance with one embodiment.
Figure 33:
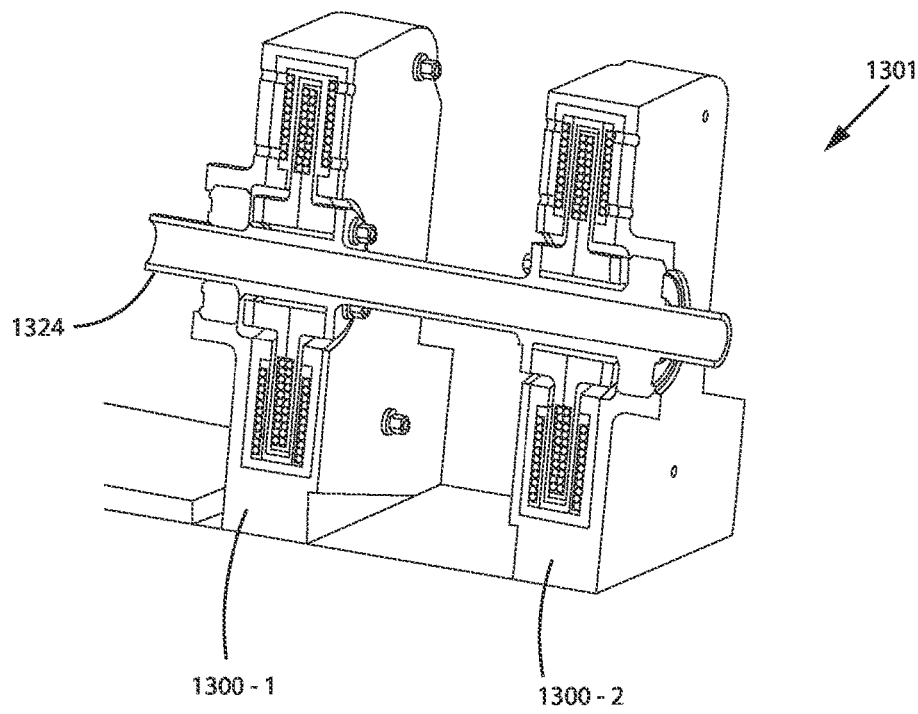
FIG. 33 shows a sectional view of the system of FIG. 32.

An example of configuration of the rotary transformer construction is depicted in the illustrated embodiment of FIGS. 32 and 33 with first and second rotary transformers 1300-1 and 1300-2, each of which may be constructed in a manner similar to the rotary transformer 100. The first rotary transformer 1300-1 may include a primary winding that receives power from a DC power supply 1370 and an inverter 1372, similar respectively to the DC power supply 170 in the inverter 172. Power from the inverter 1372 may be supplied to the primary winding via compensation circuitry 1374.

In the illustrated embodiment, the first rotary transformer 1300-1 may be coupled to the second rotary transformer 1300-2 via a shaft 1324, where the second rotary transformer 1300-2 is provided to model the field resistance of a rotor winding. The second rotary transformer 1300-2 is electrically coupled to the first rotary transformer 1300-1 via wiring 1381, and operable to supply power from a winding of the rotor to a winding of the stator of the second rotary transformer 1300-2. The winding of the stator may be coupled to compensation circuitry 1376 and rectification circuitry 1378 to supply power to a load 1380.

Although the rotary transformer 100 is described in conjunction with providing power wirelessly to the secondary winding 116 of the rotor 150 in order to provide power for rotating the rotor 150, it is to be understood that the rotor 150 may be operated as a generator such that electrical power is transferred from a winding of the rotor 150 to a winding of the stator 110, and from the winding of the stator 110 to a load. In the illustrated embodiment of FIG. 32, a motor is physically coupled to the shaft 1324 and operable to rotate the shaft 1324 and the rotor of the second rotary transformer 1300-2. The rotational power supplied to the rotary transformer 1300-2 may be supplied to a load 1380, as described herein.

Figures 6, 7:
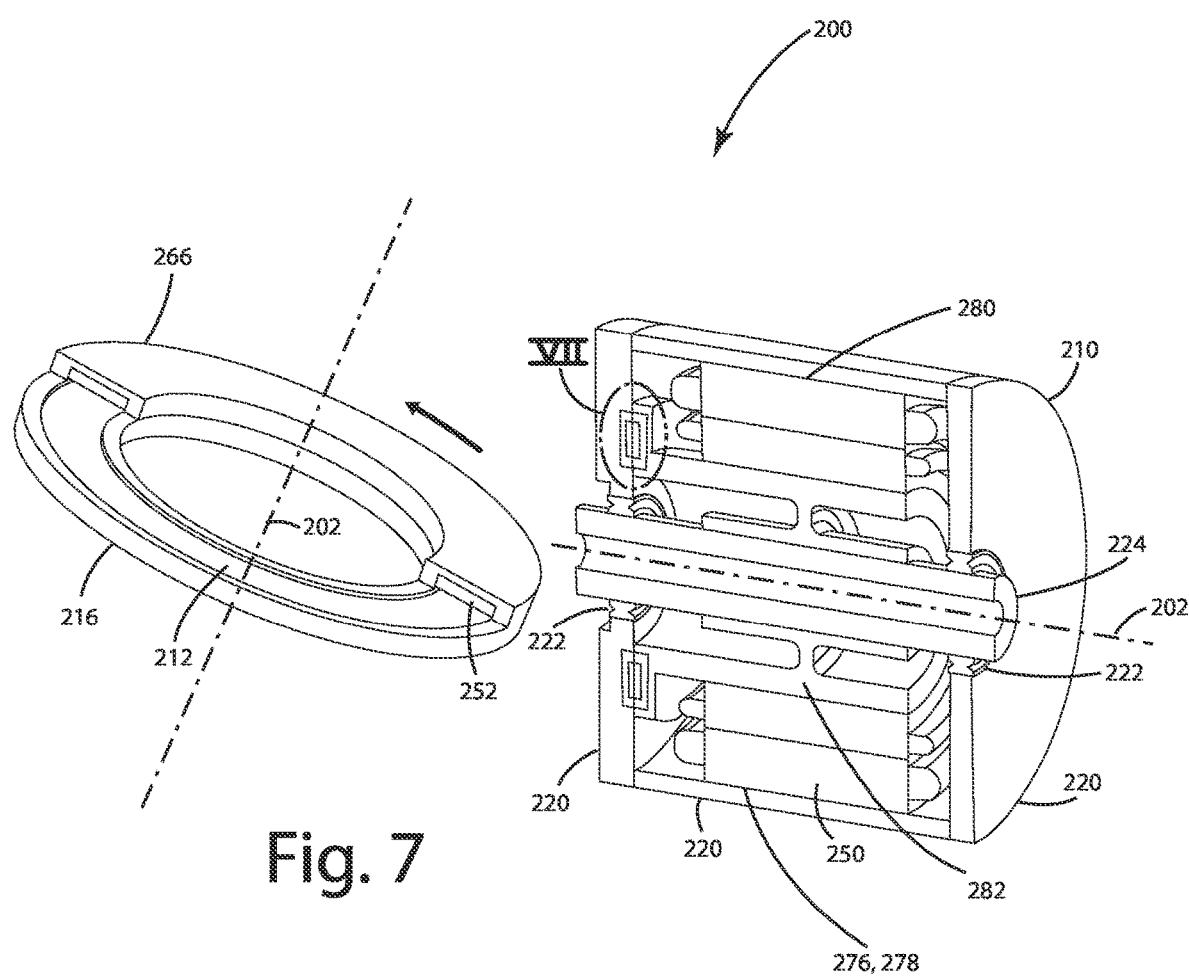
FIG. 6 shows a sectional view of a rotary transformer in accordance with one embodiment.
FIG. 7 shows a portion of the rotary transformer of FIG. 6.

In the illustrated embodiment of FIGS. 6 and 7, a rotary transformer 200 is shown in accordance with one embodiment. The rotary transformer 200 is similar in some respects to the rotary transformer 100 described in conjunction with the illustrated embodiments of FIGS. 1-5. For purposes of disclosure, parts of the rotary transformer 200 that are similar in name to parts of the rotary transformer 100 are designated by reference numbers that share the same first two digits (e.g., 2XX and 1XX designate similarly named components).

The rotary transformer 200 in the illustrated embodiment may form part of the excitation system as described herein. The rotary transformer 200 may include a primary winding 212 and a secondary winding 252 separated by a gap, defined at least in part by a gap G between opposing surfaces of the rotor 250 and the stator 210, and disposed adjacent to a primary ferromagnetic core 216 and a secondary ferromagnetic core 266. The rotary transformer 200 may include a primary ferromagnetic core 216 and a secondary ferromagnetic core 266, with the secondary winding 252 and the secondary ferromagnetic core 266 operable to rotate about a central axis 202 relative to the primary winding 212.

The rotary transformer 200 in the illustrated embodiment includes a shaft 224 coupled to the rotor 250 that rotate about the central axis 202. First and second bearings 222 may be provided to support the shaft 224 relative to the stator 210. The rotor 250 may include a rotor field winding 280 and a rotor hub 282 operable to support the rotor field winding 280 and power electronics 276, 278. The secondary winding 252 may provide electrical power to the power electronics 262, 278, which rotate with the rotor 250.

In the illustrated embodiment, the primary winding 212 and the secondary winding 216 are disposed in an axial overlapping arrangement.

With a given outer diameter and a rotor field winding resistance of 25Ω, the dimensions of the winding windows, the thickness, and inner diameter of the ferrite core may be selected, and potentially optimized, to reach an output power of 10 kW while reducing or minimizing the axial length, increasing or maximizing the rotary transformer efficiency, and substantially keeping the magnetic loading in the ferrite core at a reasonable saturation level (e.g., below 0.38 T for the ferrite material used). The number of turns in the primary and secondary windings 112, 152 may be selected to be identical and selected to keep the input voltage below 200 V. The window area of the primary and secondary windings 112, 152 may also be selected to be identical. The winding window width may affect the output power, magnetic loading, efficiency, and axial length for given outer and inner diameters of the stator core and a given input voltage. As the window width increases, the primary and secondary self-inductances decrease because of the increasing magnetic air gap. As a result, the input current may increase, first causing the output power to increase. This increase in output power, accompanied by a decrease in winding resistances may lead to an increase in efficiency. However, there is a point where the increase in current causes magnetic saturation to occur and the power becomes limited. From that point, the efficiency starts to degrade because the increase in copper loss is not accompanied by an increase in power anymore. Finally, as the window axial width increases, the axial length, and thereby the volume increases nearly linearly. In one embodiment, the window width with the highest or greater efficiency, while minimizing reducing the axial length and keeping the core flux density in the linear region, may be selected.

The aspect ratio of the winding window may be increased or optimized through the inner radius of the stator ferrite core while keeping the window area constant at the previously selected value. For a given outer diameter and input voltage, the influence of the aspect ratio of the rotary transformer on the mutual inductance, efficiency, output power, and axial length may be considered. For instance, the winding window can be varied from a "disc" shape to a rather "section of pipe" shape.

There may be an aspect ratio that increases or maximizes the mutual inductance. This enhanced or optimal aspect ratio may also increase or maximize the efficiency. The output power may first increase with the inner radius of the stator core because of the improvement in mutual inductance. But as the winding window becomes more of a "section of pipe" shape, the leakage inductance may sharply increase and cause a sudden decline in the output power. The axial length, thus the volume, may increase abruptly when the inner diameter is beyond an optimal aspect ratio. The inner radius may correspond to the aspect ratio that enhances or maximizes the mutual inductance and efficiency selected for the configuration. With the information about the optimal aspect ratio, the Litz wire may be selected to refine the configuration to achieve 10 kW transfer with the reduced or minimal axial length (i.e., volume). Also, given the particularly high top speed for traction applications (e.g., up to 16 000 r/min), the system 10 may be configured accordingly.

The magnetic circuit of the rotary transformer 100 may be configured to operate under light saturation (<0.38 T) to prevent the high frequency flux from leaking into the housing (e.g., the aluminum housing) and causing eddy current losses. Also, the rotary transformer 100 may have a large magnetic air gap, as described herein. As a result, the reluctance of the magnetic circuit may be dominated by the reluctance of the air gap. The effect of light saturation on the inductance values is reduced or minimal. The fringing high-frequency magnetic field in the inner area of the rotary transformer 100, in one embodiment, may induce eddy currents in the surrounding metallic parts of the assembly, including housing, bearing, shaft plates, and shaft. These eddy current losses may be considered and used as a basis for selection of the inner radius of the ferrite core. The losses in the bearing and housing may be low and are unlikely to produce overheating. Heat generated by losses in the shaft and shaft plates may be mitigated by active cooling.

Because traction motors can operate at speeds up to 16 000 r/min, mechanical stress of the system 10 may be considered to address the following: 1) the composite rotor support material may be configured to avoid breakage due to centrifugal stress at high speed; 2) any deformation of the composite rotor support material may be analyzed to substantially avoid rubbing between the rotor 150 and stator 110; and 3) the shaft 124 may be constructed to avoid breakage under the centrifugal stress applied by the rotor weight at high rotational speed with an overspeed margin.

II. Control Analysis

The system 10 in accordance with one embodiment, as described herein, may be controlled in a variety of ways.

As noted, the secondary side (rectifier side) the rotary transformer circuit 100 is rotating (see e.g., FIGS. 1 and 2). Therefore, measurement access to the secondary side variables may be limited—i.e., access may be limited to the secondary current and the secondary capacitor voltage for the purpose of control. The regulation of the flux generated by the field winding may be achieved by regulating the secondary current. However, in one embodiment, in the absence of any access to the secondary current, the indirect control of the flux via the primary side state variables may be utilized. For instance, the primary current, the primary capacitor voltage, or a combination thereof may form the basis for control over the system 10.

A controller 171 or control system may be provided in conjunction with the system 10 to control operation of the primary side. For instance, the controller 171 may control switching circuitry of the inverter 172 to supply power in a controlled manner to the primary winding 112 of the rotary transformer 100. The controller 171 may receive feedback via one or more sensors and use this feedback as a basis for controlling operation of the system 10. The one or more sensors, as noted above, may be configured in a variety of ways. For instance, one sensor may be coupled to the primary winding 112 such that the sensor provides a sensor output indicative of the primary current in the primary winding 112. As another example, a sensor may be provided that is configured to provide a sensor output indicative of a primary capacitor voltage (e.g., a voltage of the capacitors CP in the illustrated embodiment of FIG. 5).

In one embodiment, a sensor may be configured to detect or provide a sensor output indicative of a characteristic of power with respect to any portion of the system 10, including portions of the primary and/or secondary side. The controller 171 may control supply of power to the rotary transformer 100 based on one or more sensor outputs indicative of a characteristic of power with respect to one or more respective portions of the system 10. As an example, a sensor may be configured to provide an output indicative of the current through the primary winding 112.

The controller 171 may be operable to control an operating characteristic, such as at least one of a frequency and a pulse width of the voltage supplied to the primary winding 112 (e.g., including a duty cycle and/or a phase shift angle of the voltage pulse applied to the primary winding 112), based on one or more sensor outputs. Additional to or alternative to frequency or pulse width, based on the one or more sensor outputs, the controller 171 may be configured to direct a change in an operating characteristic in the form of the DC output level of the DC power supply 170.

Accordingly, the controller 171 may be operable to vary one or more operating characteristics of the system 10 based on one or more sensor outputs.

Although, as noted above, the secondary side is rotating in the system 10, the secondary side may include one or more sensors and communication circuitry operable to communicate sensor feedback to the primary side. Such communication circuitry may utilize the coupling between the primary and secondary windings 112, 152 (e.g., backscatter modulation) to transfer information to the primary side (e.g., the controller 171). Additionally, or alternatively, the communication circuitry may enable communication between the secondary side and the primary side separate from the coupling between the primary and secondary windings. Such a separate communication system may utilize transmission circuitry for wirelessly communicating from the secondary side to the primary side in a manner that does not involve transmitting a signal via the secondary winding 152 of the secondary side.

Additionally, or alternatively, the controller 171 may be operable to direct operation of the secondary side of the system 10 via a communication with one or more aspects of the secondary side. For instance, the controller 171 may be configured to direct operation of the rectification circuitry 178 (e.g., active rectification circuitry) based on one or more sensor outputs. The secondary side of the system 10 in this configuration may include a controller (not shown) configured to receive communications from the controller 171 and control the rectification circuitry 178 based on such communications. The controller of the secondary side of the system 10 in this configuration may be operable to transmit communications to the controller 171, such as communications pertaining to one or more sensor outputs generated on the secondary side.

The secondary current in one embodiment may be substantially insensitive to changes in the field winding resistance of the field winding 180. The field excitation system 10 may be configured to substantially maintain a constant field winding flux irrespective of changes in the field winding resistance, and as the field winding flux is directly proportional to the secondary current, the pulse width can be determined for a given field winding flux, such that the field flux can be maintained irrespective of changes in field winding resistance from temperature variation.

Figure 34:
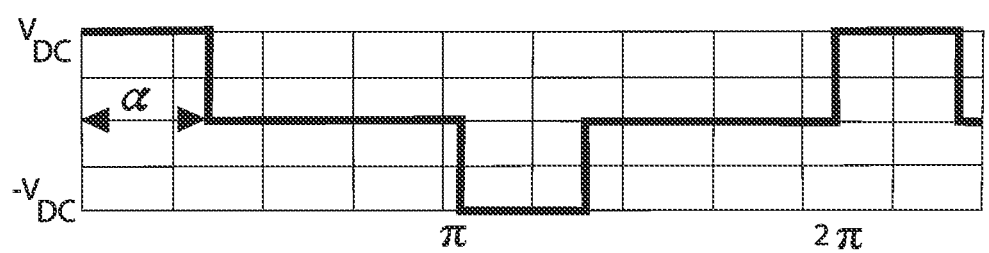
FIG. 34 shows a control signal to inverter circuitry in accordance with one embodiment.

In one embodiment, the controller 171 may be configured to direct operation of the inverter 172 to supply power to the rotary transformer 100 in accordance with the waveform depicted in FIG. 34. The waveform in FIG. 34 is a square wave applied to input terminals of the rotary transformer 100 at a pulsation ω having a 2π period. In one embodiment, the frequency may be 20 kHz. In one embodiment, where the rotary transformer 100 is compensated, the primary side resident compensation circuitry 174 and the secondary side resident compensation circuitry 176 may include a capacitor selected such that a resonant frequency is near or equal to the switching frequency of the inverter 172. For instance, in the case of a series-series compensation configuration, the primary side and secondary side capacitors may be determined according to the following:

$$C_p = \frac{1}{\omega^2 L_p}; C_s = \frac{1}{\omega^2 L_s}$$

The illustrated embodiment of FIG. 34 identifies the angle α, which corresponds to the pulse width between the legs of the inverter and can vary from α=0° to α=180°, with α=0° being a circumstance where no power is transferred from the DC source 170 to the field winding 180 and α=180° being a circumstance where maximum power is transferred from the DC source 170 to the field winding 180. The pulse width α may be varied to control operation based on feedback from one or more sensors, as described herein.

In one embodiment, the pulse width a may be 180°, while the input voltage to transfer a power of 10 kW to the field winding is provided. This condition may be analyzed to yield the minimum voltage to transfer 10 kW to the field winding in each case. The input power factor, efficiency, and peak steady state field winding voltage can be determined. It can be determined that the minimum input DC voltage for a 10 kW output power for the uncompensated case is 580V and 145.5V for the primary-side series compensated configuration (174-1) and primary and secondary side series compensated configurations (174-1, 176-3). Also, the input power factor may be lower for the uncompensated configuration as compared to the primary side series compensated configuration and the primary and secondary side series compensated configurations.

In one embodiment, the uncompensated configuration may have yield system variables that do not have significant peak transient values, such that the system 10 does not require significant protection. If the system 10 is not compensated, the additional component count (ACC) is zero compared to compensated configurations which include an additional component count of 1 for the primary-side series-compensated configuration (174-1) and with an additional component count of 2 for the primary-side and secondary side compensated configuration (174-1, 176-3). However, the uncompensated configuration may use a much higher input DC voltage (more than three times the other configurations) to yield effective power transfer. Furthermore, the low input power factor for the uncompensated configuration also means a higher apparent power, and therefore the power devices in the inverter 172 may have higher ratings compared to the compensated configuration. Although the uncompensated configuration involves higher input voltage, it applies the least steady state peak voltage (e.g., 510V) to the field winding for 10 kW output power compared to compensated configurations. Between the primary side series compensation configuration and the primary and secondary side series compensation configuration, there may be no significant difference. It is noted that, from a mechanical point of view, removing the compensation capacitor or compensation circuitry from the rotor 150 may enable high operating speed operation with reduced imbalance and fatigue.

Another system parameter that can change with the operating conditions is the capacitance of the compensating capacitor 174 and/or the compensating capacitor 176. The change in the value of the capacitance of the compensating capacitor 174, 176 is that it changes the resonance frequency. With the change in resonance frequency, the power transmission capability and efficiency can be reduced.

The controller 171 may control operation of the system 10 to compensate for changes in resonance frequency that result from changes in the primary capacitor capacitance value of the compensating capacitor 174. The system 10 may possess higher or its highest efficiency and power transfer capability when the system 10 operates at the resonance frequency. Accordingly, in one embodiment, the controller 171 may dynamically change the switching frequency of the inverter 172 to increase or achieve maximum efficiency operating conditions.

III. Compensation Circuitry and Control

With conventional fixed position wireless power systems applied to battery charging for instance, secondary variables can be measured for control, via, in some cases, a dedicated short-range communication link. The field excitation system 10, in one embodiment, may not provide access to the secondary variables and therefore calculating efficiency and output power to compensate for changes in resonance frequency because of changes in capacitor may be limited to primary-side variables. The variables for control may include the input voltage, input current, and primary capacitor voltage, by sensing the input voltage, input current, and the input impedance, as described herein. At resonance, the imaginary part of the input impedance is zero, and therefore adjusting the switching frequency such that the imaginary part of the measured input impedance is zero may achieve enhanced or maximum operating conditions in terms of efficiency.

In one embodiment, for EV traction applications, the temperature of the rotor field winding 180 is expected to vary significantly, causing a corresponding variation in the resistance of the field winding 180. Other system parameters, such as the capacitance of the compensating circuitry 176, may also vary with the temperature. In one embodiment, despite these variations, the controller 171 and/or the system construction may be configured to keep the secondary current of the excitation system 10 substantially constant to ensure that the field winding 180 produces a constant flux. Regulation of the secondary current can be achieved in a variety of ways, including configurations where a current measurement on the rotating secondary side is impractical. As described herein, control methods of the controller 171 may rely only on primary variables (e.g., sensor output with respect to one or more operating conditions on the primary side).

In one embodiment, a rotary transformer 100 and system 10 that implement an open loop control of the excitation system (with open-loop being considered an absence of sensor feedback from the secondary side) may enable a reduced component count and therefore increase power density of the overall system. The control variable in the field excitation system 10, in one embodiment, may be the pulse width α, and control of this parameter may enable the system to counteract changes due to temperature to achieve substantially constant secondary coil current.

In one embodiment, it is noted that the secondary current is sensitive to the changes in the field winding resistance when there is no compensation. However, with compensation circuitry, the secondary current is insensitive to the variation of the field winding resistance over a temperature range of −50° C.-150° C. Accordingly, the system 10 in accordance with one embodiment, may maintain substantially constant secondary current, such that the excitation flux may be substantially constant despite possible variations in the field winding resistance. The insensitivity of the secondary current to the load resistance has been observed for the cases of a primary side series compensation circuit (FIG. 28—174-1) and for a primary and secondary side series compensation circuit configuration (FIG. 27—174-1, 176-3). One or both of these configurations may yield a system 10 that can be can be controlled as open-loop with the pulse width to operate at a given DC field current if other system parameters remain constant.

It is noted that in one embodiment of the system there may be sensitivity of the secondary and the primary currents to changes in the capacitor values of the compensation circuitry 174, 176. As a result, capacitor technologies with high thermal stability may be used in the system 10 to prevent or reduce changes in capacitance to variations in temperature.

As described herein, a variety of compensation circuits may be incorporated onto the primary side or the secondary side (e.g., with respect to the stator 110 and the rotor 150). Example configurations are shown in FIGS. 23-24 and 26-31.

The primary side, as described herein, is associated with the side that includes an inverter 172 and is configured to transmit power, while the secondary side refers to the side that includes the rectification circuitry 178. For purposes of disclosure, the primary side and the secondary side are described in conjunction with the compensation circuits depicted in FIGS. 23-24, and are not described in conjunction with a parallel (shunt capacitor) configuration of the primary side.

The capacitors in the configurations of compensation circuits 174-1, 176-2, 176-3 may be selected to resonate with the self-inductances of the primary and secondary windings 112, 152 respectively. Phase shift control may be determined to regulate the power transferred to the field winding. For a pulse width α=180° (where a is the pulse width between the two legs of the inverter), for any given input DC voltage, maximum power may be transferred to the field winding 180. As a result, the minimum voltage used to transfer a desired power of 10 kW to the field winding can be determined. The minimum DC bus voltage to transfer 10 kW to the field winding 180 in one embodiment is 520V for a system 10 that is absent compensation circuitry, and 671.5V for the compensation configuration depicted in FIGS. 27 and 28. The minimum DC voltage to transfer 10 kW to the field winding 180 indicates the power transfer capability of the uncompensated system and the compensated system of FIGS. 27-28. The compensated systems of FIGS. 27-28 may have higher power transfer capability, using less than one-third (146V) of the DC bus voltage of the uncompensated configurations (560V). Thus, while compensation can enhance the power transfer capability of the transformer 100 in accordance with one embodiment, it can also degrade the power transfer capability of a conventional transformer with a small airgap. In other words, while the transformer 100 according to one embodiment with a large airgap can benefit from resonant compensation circuitry, the conventional transformer does not appreciably benefit from such compensation. It is worth noting that—for the rotary transformer 100—compensation does not only enhance the power transfer capability but also improves the dynamic response of the system 100 and eases the control.

The rotary transformer 100 in accordance with one embodiment has a larger air gap relative to a conventional rotary transformer. This larger airgap yields a lower coupling factor between the primary and secondary windings 112, 152. Example coupling factors are 0.956 relative to a coupling factor of 0.987 for a conventional rotary transformer. As the coupling factor increases, such as in the case of a conventional rotary transformer, use of compensation does not lead to significant improvement. For an ideal transformer with a coupling factor of k=1 for instance, compensating such an ideal transformer does not enhance its performance in any way. The rotary transformer 100 in accordance with one embodiment is configured for a large airgap, thus a lower coupling, to achieve a much higher operating speed relative to a conventional rotary transformer, and uses compensating circuits to obtain the target power transfer of the excitation system 10.

The electrical parameters of the system 10 can be identified using open circuit and short circuit transient finiteelement (FE) simulations. Because of its large magnetic airgap, the primary and secondary self-inductances of the rotary transformer 100 are lower relative to conventional constructions. This may lead to a higher magnetizing current and as a result a higher copper loss. However, it should be noted that only a small amount of power covering the ohmic loss in the rotor field winding 180 of the system 10 is transferred through the rotary transformer 100. A small increase in the rotary transformer copper loss may have little to no effect on the overall motor efficiency of the system. Also, the volume occupied by the resonant capacitors of the compensation circuitry may be offset by the significant volume reduction enabled by the boost in power transfer capability from the resonant compensation.

Interleaving the primary and secondary windings 112, 152 may significantly reduce leakage inductances of the rotary transformer 100. As a result, an interleaved winding configuration may be implemented, as depicted in FIGS. 1-3, to enable a lower total leakage inductance and maintain a similar coupling factor compared to a conventional transformer. Due at least in part to the large electromagnetic airgap of the rotary transformer 100, the rotary transformer 100 can take advantage of a resonant compensation circuit to significantly improve power transfer capability. For instance, a series/series compensation circuit depicted in FIG. 27 may be utilized to facilitate integration into an excitation system 10. This compensation circuit of FIG. 27 also enables a unity power factor operation of the overall system 10.

The power transfer capability of the rotary transformer 100 is significantly greater than a conventional transformer for the cases with and without resonant compensation. When no resonant compensation is used, the rotary transformer 100 has a slightly lower power transfer capability than the conventional transformer due to the larger electromagnetic airgap. However, with resonant compensation, the power transfer capability of the rotary transformer 100 is increased by eight times for an input voltage of 160 V. The compensating capacitors may be selected to resonate with the transformer's self-inductances at the frequency of operation, such that the input impedance of the system 100 is significantly reduced compared to a noncompensated configuration. As a result, the input current and, therefore, the magnetic field created from the primary and the power transferred is significantly increased. It is noted that resonant compensation may not improve power transfer when near ideal coupling such as in the conventional rotary transformer. This is confirmed in FIG. 5 where the power transfer of the conventional transformer deteriorates when resonant compensation is used.

IV. Alternative Configurations

Various alternative configurations of the rotary transformer, including axial overlapping and radial overlapping arrangements, are depicted in the illustrated embodiments of FIGS. 8-17. It is noted that in one or more configurations in the illustrated embodiments, the rotary transformers of FIGS. 12-16 may include state or winding structures that are easier to manufacture and less costly relative to the rotary transformers of FIGS. 8-11. For purposes of disclosure, parts of the rotary transformers in the illustrated embodiments of FIGS. 8-17 that are similar in name to parts of the rotary transformer 100 and other rotary transforms described herein are designated by reference numbers that share the same first two digits (e.g., 6XX and 1XX designate similarly named components).

Figure 15:
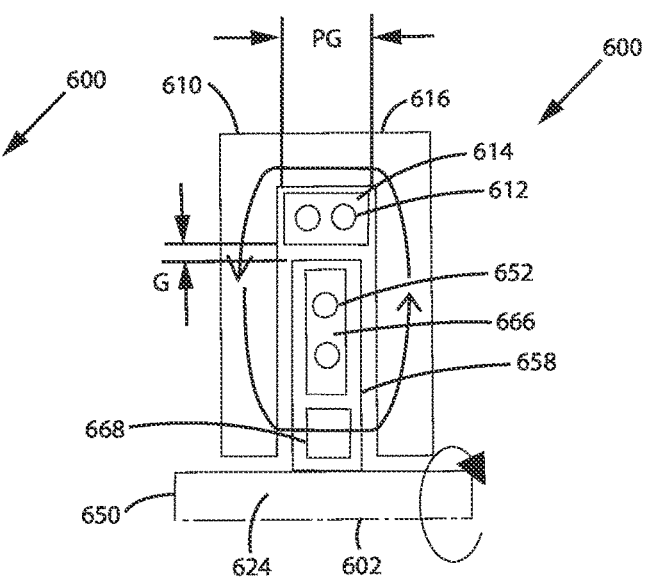
FIG. 15 shows a representative view of a rotary transformer in accordance with one embodiment.

In the illustrated embodiment of FIG. 15, a rotary transformer 600 is shown to include components similar to the rotary transformer 100, 200. For instance, the rotary transformer 600 includes a primary winding 612 and a secondary winding 652 separated by a gap, defined at least in part by a gap G between opposing surfaces of the rotor 650 and the stator 610, and disposed adjacent to a primary ferromagnetic core 616 and a secondary ferromagnetic core 666. The rotary transformer 600 may include a primary ferromagnetic core 616 and a secondary ferromagnetic core 666, with the secondary winding 652 and the secondary ferromagnetic core 666 operable to rotate about a central axis 602 relative to the primary winding 612.

The rotary transformer 600 in the illustrated embodiment includes a shaft 624 coupled to the rotor 650 that rotates about the central axis 602. The shaft 624 may be a metallic material; however, the present disclosure is not so limited. The shaft 624 may be formed of a non-magnetic material to reduce or minimize leakage fluxes. A nonconductive shaft can also reduce or minimize the eddy current losses and the shaft.

The stator 610 of rotary transformer 600 in the illustrated embodiment includes a ferromagnetic material, such as ferrite, soft magnetic composite, laminated electric steel, or a combination thereof.

The rotor support 658 in the illustrated embodiment may encapsulate the secondary winding 258 and first and second secondary ferromagnetic cores 666, 668. The rotor support 658 may be formed of a mechanically strong non-conductive and non-magnetic material, such as glass fiber or carbon fiber, G 12, BMI, thermoplastic, ceramic, or cermet, or a combination thereof.

The second secondary ferromagnetic core 668 may be introduced, as depicted in several embodiments described herein, in various positions relative to the rotor support 658 and stator 610. The second secondary ferromagnetic core 668 may be introduced in the rotor 652 guide magnetic fluxes and reduce flux leakage.

In the illustrated embodiment, the gap G may be within a range of 10 to 20 times of conventional gaps provided between a primary and secondary winding. The gap G may be substantially uniform about the rotor support 658, as depicted in the illustrated embodiment. Alternatively, the gap G may be different relative to different surfaces of the rotor support 658. For instance, in the illustrated embodiment, the gap G between the rotor support 258 and the primary ferromagnetic core 614 may be different from a gap between the stator 210 and sides of the rotor support 258 adjacent to the side facing the primary ferromagnetic core 614.

In the illustrated embodiment of FIGS. 8-11, a rotary transformer 300, 400 is depicted in a configuration similar to the rotary transformer 100. As noted herein, for purposes of disclosure, parts of the rotary transformer 300, 400 that are similar in name to parts of the rotary transformer 100 are designated by reference numbers that share the same first two digits (e.g., 2XX and 1XX designate similarly named components).

The rotary transformer 300, 400 in the illustrated embodiment may form part of the excitation system as described herein. The rotary transformer 300, 400 may include a primary winding 312, 412 and a secondary winding 352, 452 separated by a gap, defined at least in part by a gap G between opposing surfaces of the rotor 350, 450 and the stator 310, 410, and disposed adjacent to a primary ferromagnetic core 316, 416 and a secondary ferromagnetic core 366, 466. The rotary transformer 300, 400 may include a primary ferromagnetic core 316, 466 and a secondary ferromagnetic core 366, 466, with the secondary winding 352, 452 and the secondary ferromagnetic core 366, 466 operable to rotate about a central axis 302, 402 relative to the primary winding 312A-B, 412A-B.

The rotary transformer 300, 400 in the illustrated embodiment includes a shaft 324, 424 coupled to the rotor 350, 450 that rotates about the central axis 302, 402. First and second bearings may be provided to support the shaft 324, 424 relative to the stator 310, 410. The rotor 350, 450 may include a rotor field winding and a rotor hub operable to support the rotor field winding and power electronics. The secondary winding 352, 452 may provide electrical power to the power electronics, which rotate with the rotor 350, 450.

Figure 9:
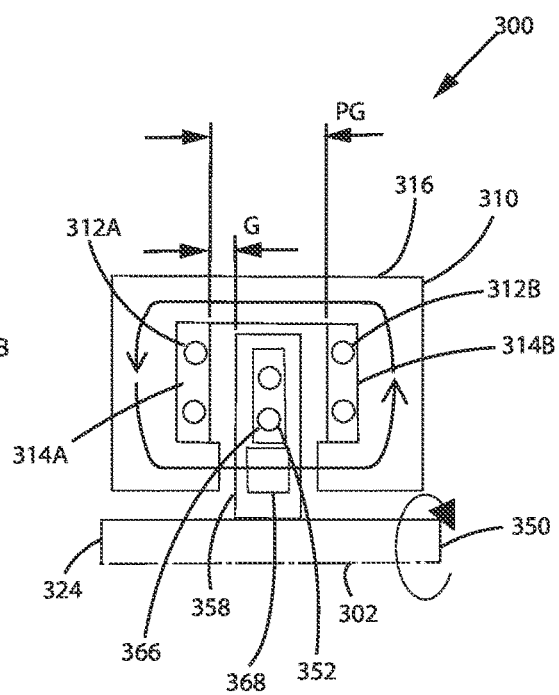
FIG. 9 shows a representative view of a rotary transformer in accordance with one embodiment.
Figure 10:
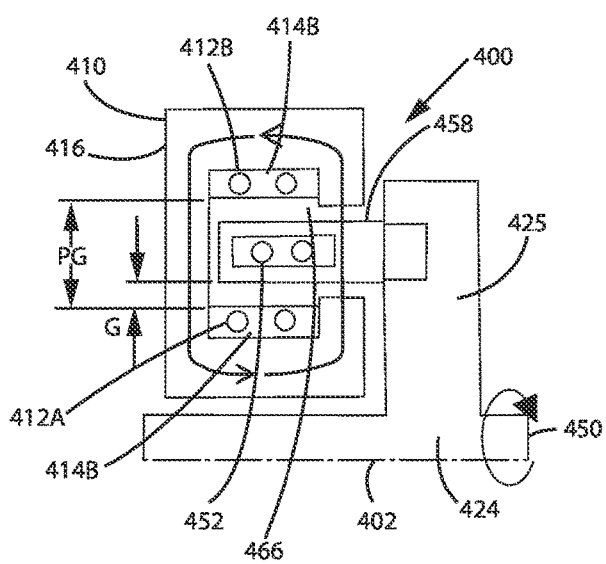
FIG. 10 shows a representative view of a rotary transformer in accordance with one embodiment.
Figure 11:
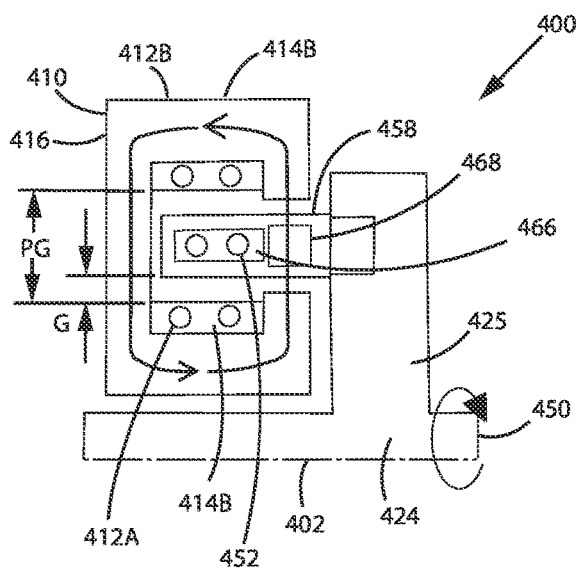
FIG. 11 shows a representative view of a rotary transformer in accordance with one embodiment.

In the illustrated embodiments of FIGS. 9 and 11, the rotary transformer 300, 400 includes a secondary ferromagnetic core 366, 466 configured to guide flux to reduce or prevent flux leakage and heat generation in other areas of the rotary transformer 300, 400, such as the housing, bearings, shaft plates, and shaft.

Figure 8:
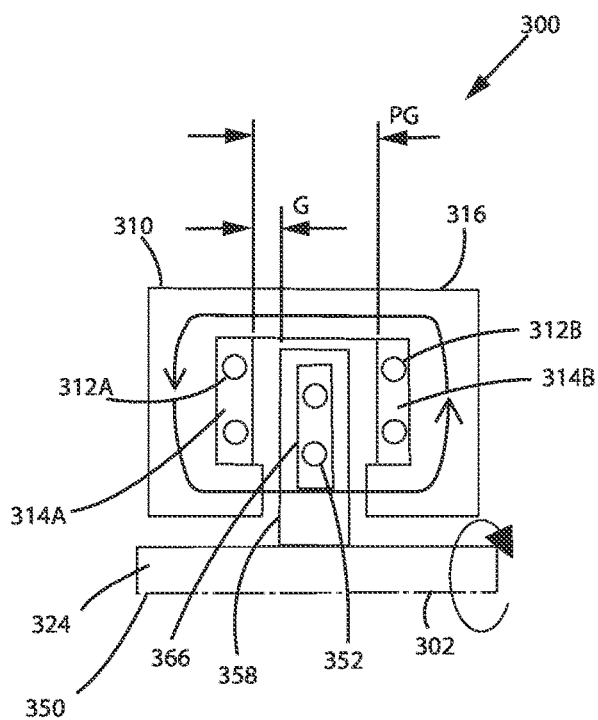
FIG. 8 shows a representative view of a rotary transformer in accordance with one embodiment.

In the illustrated embodiments of FIGS. 8 and 9, the primary winding 312A-B and the secondary winding 316 are disposed in an axial overlapping arrangement. And, in the illustrated embodiments of FIGS. 10 and 11, the primary winding 412A-B and the secondary winding 416 are disposed in a radial overlapping arrangement In the illustrated embodiment of FIGS. 14-16, a rotary transformer 600, 700 is depicted in a configuration similar in some respects to the rotary transformer 100. As noted herein, for purposes of disclosure, parts of the rotary transformer 600, 700 that are similar in name to parts of the rotary transformer 100 are designated by reference numbers that share the same first two digits (e.g., 6XX and 1XX designate similarly named components).

The rotary transformer 600, 700 in the illustrated embodiment may form part of the excitation system as described herein. The rotary transformer 600, 700 may include a primary winding 612, 712 and a secondary winding 652, 752 separated by a gap, defined at least in part by a gap G between opposing surfaces of the rotor 650, 750 and the stator 610, 710, and disposed adjacent to a primary ferromagnetic core 616, 716 and a secondary ferromagnetic core 666, 766. The rotary transformer 600, 700 may include a primary ferromagnetic core 616, 716 and a secondary ferromagnetic core 666, 766, with the secondary winding 652, 752 and the secondary ferromagnetic core 666, 766 operable to rotate about a central axis 602, 702 relative to the primary winding 612, 712.

The rotary transformer 600, 700 in the illustrated embodiment includes a shaft 624, 724 coupled to the rotor 650, 750 that rotates about the central axis 602, 702. First and second bearings may be provided to support the shaft 624, 724 relative to the stator 610, 710. The rotor 650, 750 may include a rotor field winding and a rotor hub operable to support the rotor field winding and power electronics. The secondary winding 652, 752 may provide electrical power to the power electronics, which rotate with the rotor 650, 750.

Figure 16:
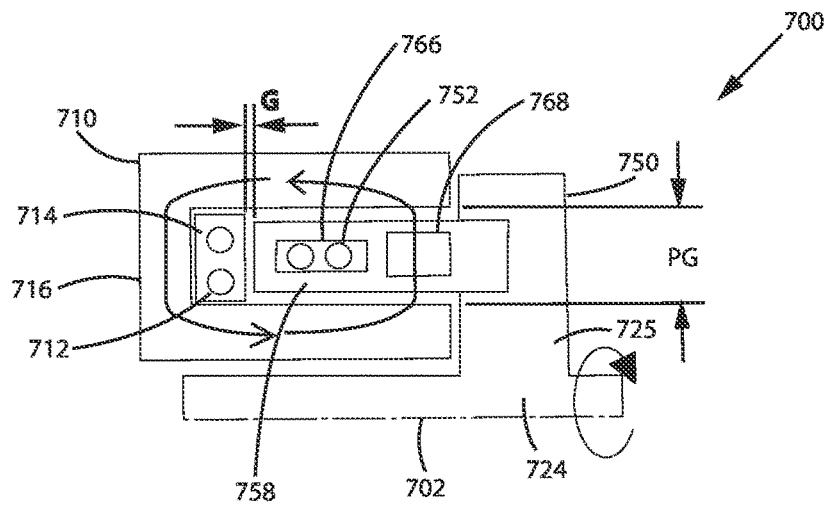
FIG. 16 shows a representative view of a rotary transformer in accordance with one embodiment.

In the illustrated embodiments of FIGS. 15 and 16, the rotary transformer 600, 700 includes a second secondary ferromagnetic core 666, 766 configured to guide flux to reduce or prevent flux leakage and heat generation in other areas of the rotary transformer 600, 700, such as the housing, bearings, shaft plates, and shaft.

Figure 14:
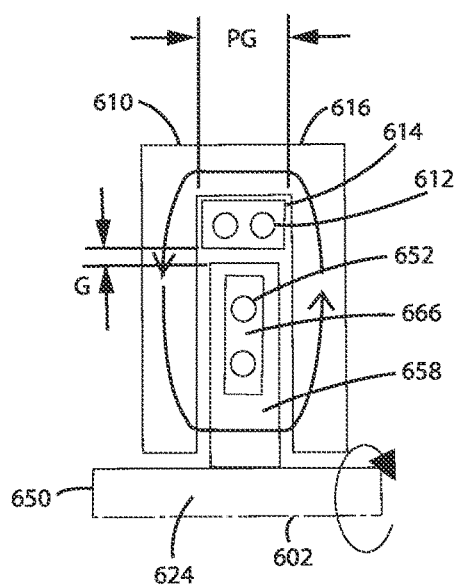
FIG. 14 shows a representative view of a rotary transformer in accordance with one embodiment.

In the illustrated embodiments of FIGS. 14-15, the primary winding 612 and the secondary winding 616 are disposed in a radial overlapping arrangement. And, in the illustrated embodiment of FIG. 16, the primary winding 712 and the secondary winding 716 are disposed in an axial overlapping arrangement. In the illustrated embodiments, the primary winding 612, 712 and the secondary winding 616, 716 are disposed in a transverse relationship such that the winding axes of the primary winding 612, 712 and the secondary winding 616, 716 are substantially orthogonal with respect to each other. The primary ferromagnetic core 614, 714, the secondary ferromagnetic core 666, 766, the second secondary ferromagnetic core 668, 768, or a combination thereof, may form at least part of a flux path for coupling between the primary winding 612, 712 and the secondary winding 616, 716.

Figure 12:
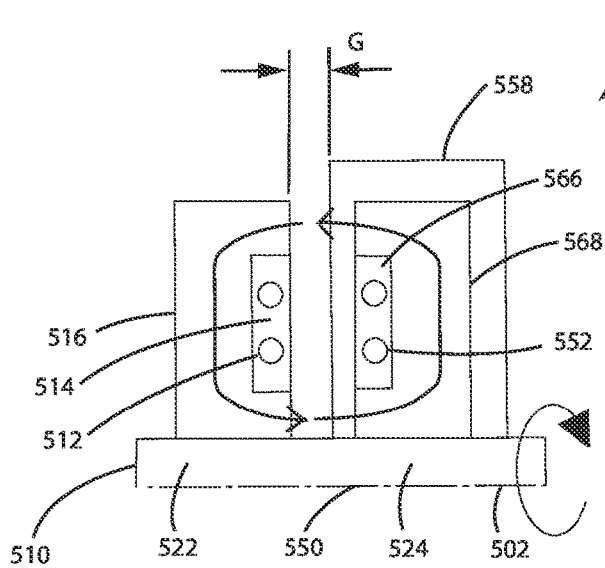
FIG. 12 shows a representative view of a rotary transformer in accordance with one embodiment.
Figure 13:
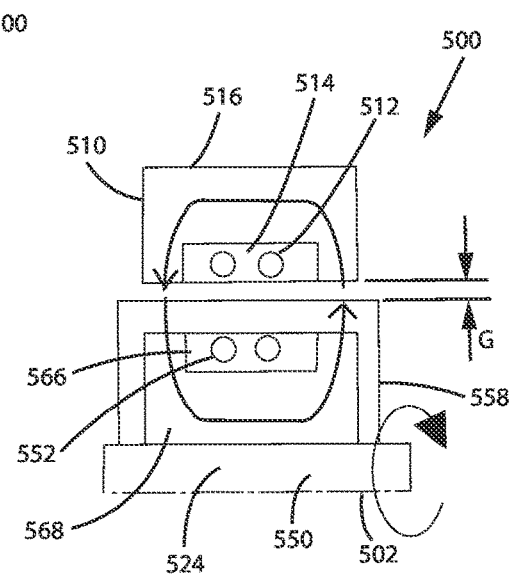
FIG. 13 shows a representative view of a rotary transformer in accordance with one embodiment.
Figure 17:
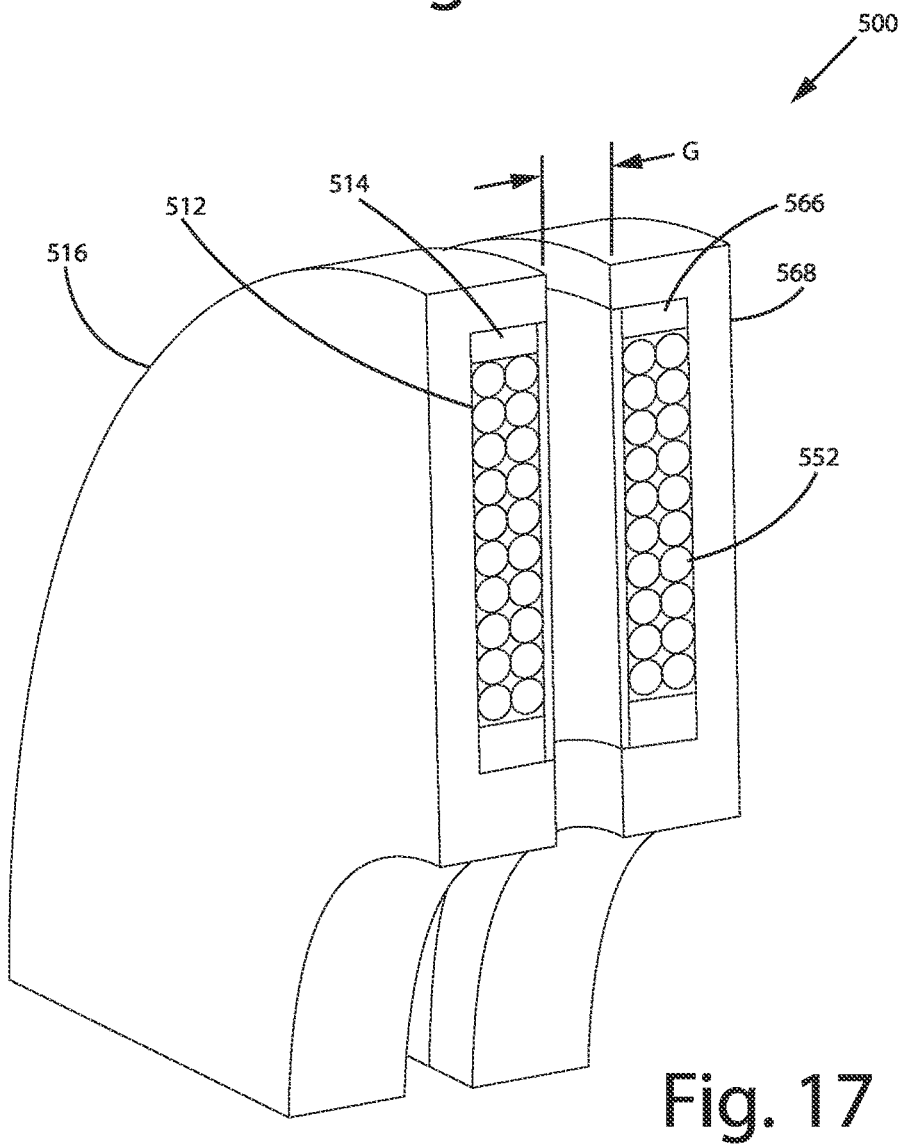
FIG. 17 shows a portion of a rotary transformer in accordance with the embodiment of FIG. 12.

In the illustrated embodiment of FIGS. 12-13 and 17, a rotary transformer 500 is depicted in a configuration similar in some respects to the rotary transformer 200. As noted herein, for purposes of disclosure, parts of the rotary transformer 500 that are similar in name to parts of the rotary transformer 200 are designated by reference numbers that share the same first two digits (e.g., 5XX and 2XX designate similarly named components).

The rotary transformer 500 in the illustrated embodiment may form part of the excitation system as described herein. The rotary transformer 500 may include a primary winding 512 and a secondary winding 552 separated by a gap, defined at least in part by a gap G between opposing surfaces of the rotor 550 and the stator 510, and disposed adjacent to a primary ferromagnetic core 516 and a secondary ferromagnetic core 566. The rotary transformer 500 may include a primary ferromagnetic core 516 and a secondary ferromagnetic core 566, with the secondary winding 552 and the secondary ferromagnetic core 566 operable to rotate about a central axis 502 relative to the primary winding 512.

The rotary transformer 500 in the illustrated embodiment includes a shaft 524 coupled to the rotor 550 that rotates about the central axis 502. First and second bearings may be provided to support the shaft 524 relative to the stator 510. The rotor 550 may include a rotor field winding and a rotor hub operable to support the rotor field winding and power electronics. The secondary winding 552 may provide electrical power to the power electronics, which rotate with the rotor 550.

In the illustrated embodiment of FIG. 12, the primary winding 512 and the secondary winding 516 are disposed in an axial overlapping arrangement. And, in the illustrated embodiment of FIG. 13, the primary winding 512 and the secondary winding 516 are disposed in a radial overlapping arrangement.

V. Multiple Transformers

As described herein, the components rotary transformer may be operable in conjunction with multiple rotary transformers, such as the multiple rotary transformer configurations depicted in the illustrated embodiments of FIGS. 18-22. Configurations that implement multiple rotary transformers may be utilized in conjunction with three-phase systems. However, it is noted that the present disclosure is not so limited—more than three rotary transformers and three phases may be achieved, such as for 6, 9, or 12 phase systems, that operate with higher pulse replication and provide lower ripple DC current.

In a three-phase or multiphase system, primary and/or secondary winding can be arranged in a polygon (Delta) or star configuration. Resident compensation circuitry can also be connected in a Delta or star configuration.

Figure 18:
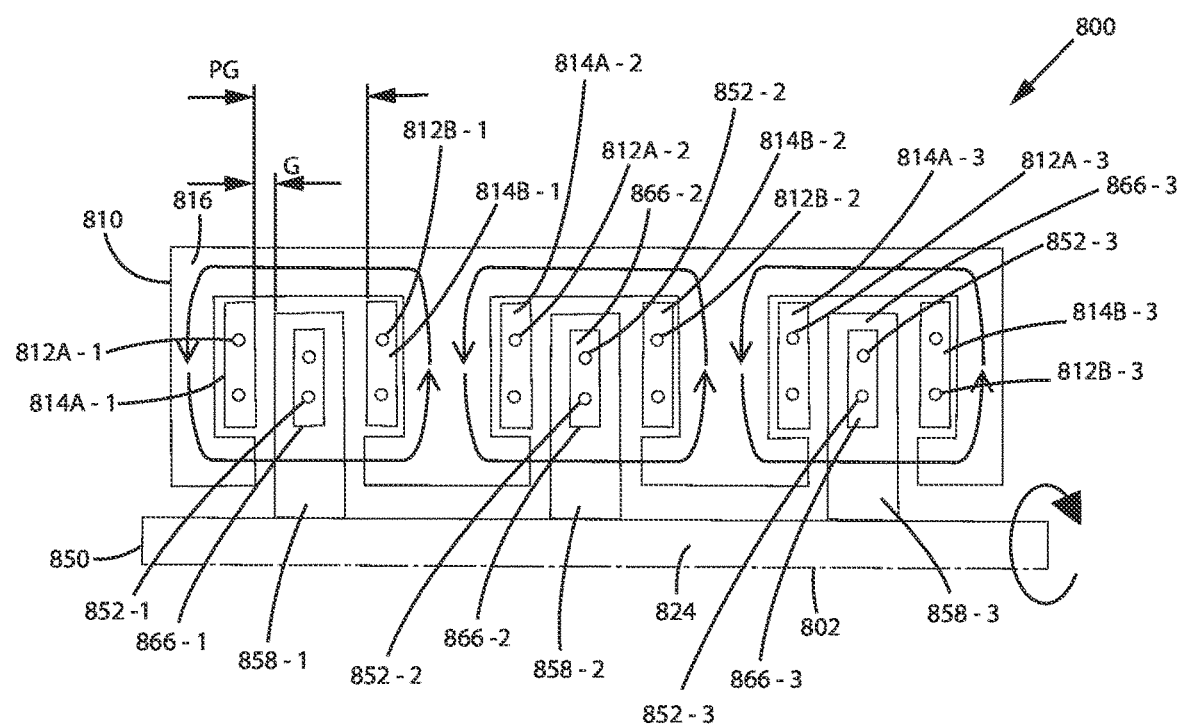
FIG. 18 shows a representative view of multiple rotary transformers in accordance with one embodiment.
Figure 19:
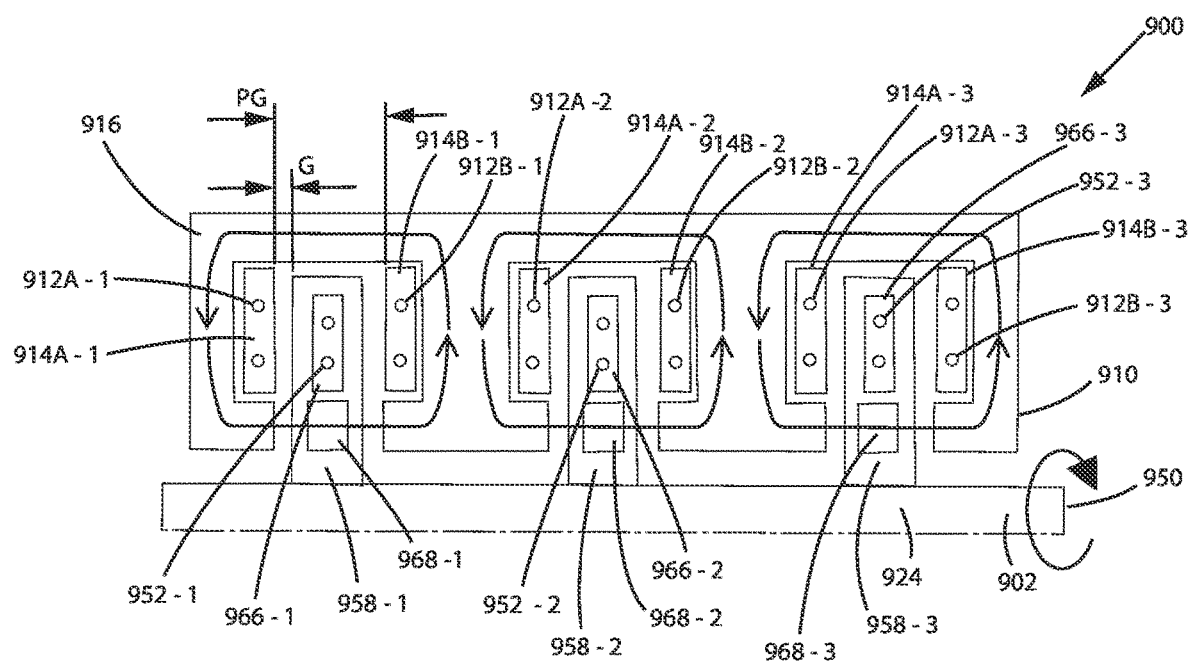
FIG. 19 shows a representative view of multiple rotary transformers in accordance with one embodiment.

In the illustrated embodiment of FIGS. 18-19, a rotary transformer 800, 900 is depicted in a configuration similar to the rotary transformer 100, 300. As noted herein, for purposes of disclosure, parts of the rotary transformer 800, 900 that are similar in name to parts of the rotary transformer 100, 300 are designated by reference numbers that share the same first two digits (e.g., 3XX and 8XX designate similarly named components). Similarly, with respect to the rotary transformer 800, 900 with multiple rotary transformers, components of respective ones of the rotary transformers are designated by a hyphenated number (e.g., secondary winding 852-1 and secondary winding 852-2 are respective components of first and second rotary transformers of the rotary transformer 800.

The rotary transformer rotary transformer 800, 900 in the illustrated embodiment may form part of the excitation system as described herein. The rotary transformer 800, 900 may include first, second, and third rotary transformers associated with components hyphenated respectively -1, -2, -3. It is to be understood that a greater or lesser number of rotary transformers may be incorporated into the rotary transformer 800, 900. The rotary transformer 800, 900 may include primary windings 812-1, 812-2, 812-3, 912-1, 912-2, 912-3 and a secondary winding 852-1, 852-2, 852-3, 952-1, 952-2, 952-3 separated by a gap, defined at least in part by a gap G between opposing surfaces of the rotor 850-1, 850-2, 850-3, 950-1, 950-2, 950-3 and the stator 810-1, 810-2, 810-3, 910-1, 910-2, 910-3, and disposed adjacent to a primary ferromagnetic core 816, 916, which may be shared by the first, second, in third rotary transformers, and a secondary ferromagnetic core 866-1, 866-2, 866-3, 966-1, 966-2, 966-3. The rotary transformer 800, 900 may include a primary ferromagnetic core 816, 916 and a secondary ferromagnetic core 866-1, 866-2, 866-3, 966-1, 966-2, 966-3, with the secondary winding 852-1, 852-2, 852-3, 952-1, 952-2, 952-3 and the secondary ferromagnetic core 866-1, 866-2, 866-3, 966-1, 966-2, 966-3 operable to rotate about a central axis 802, 902 relative to the primary winding 812AB-1, 812AB-2, 812AB-3, 912AB-1, 912AB-2, 912AB-3.

The rotary transformer 800, 900 in the illustrated embodiment includes a shaft 824, 924 coupled to the rotor 850-1, 850-2, 850-3, 950-1, 950-2, 950-3 that rotates about the central axis 802, 902. First and second bearings may be provided to support the shaft 824, 924 relative to the stator 810-1, 810-2, 810-3, 910-1, 910-2, 910-3. The rotor 850-1, 850-2, 850-3, 950-1, 950-2, 950-3 may include a rotor field winding and a rotor hub operable to support the rotor field winding and power electronics. The secondary winding 852-1, 852-2, 852-3, 952-1, 952-2, 952-3 may provide electrical power to the power electronics, which rotate with the rotor 850-1, 850-2, 850-3, 950-1, 950-2, 950-3.

In the illustrated embodiment of FIG. 19, the rotary transformer 900 includes a secondary ferromagnetic core 966-1, 966-2, 966-3 configured to guide flux to reduce or prevent flux leakage and heat generation in other areas of the rotary transformer 900, such as the housing, bearings, shaft plates, and shaft.

Figure 21:
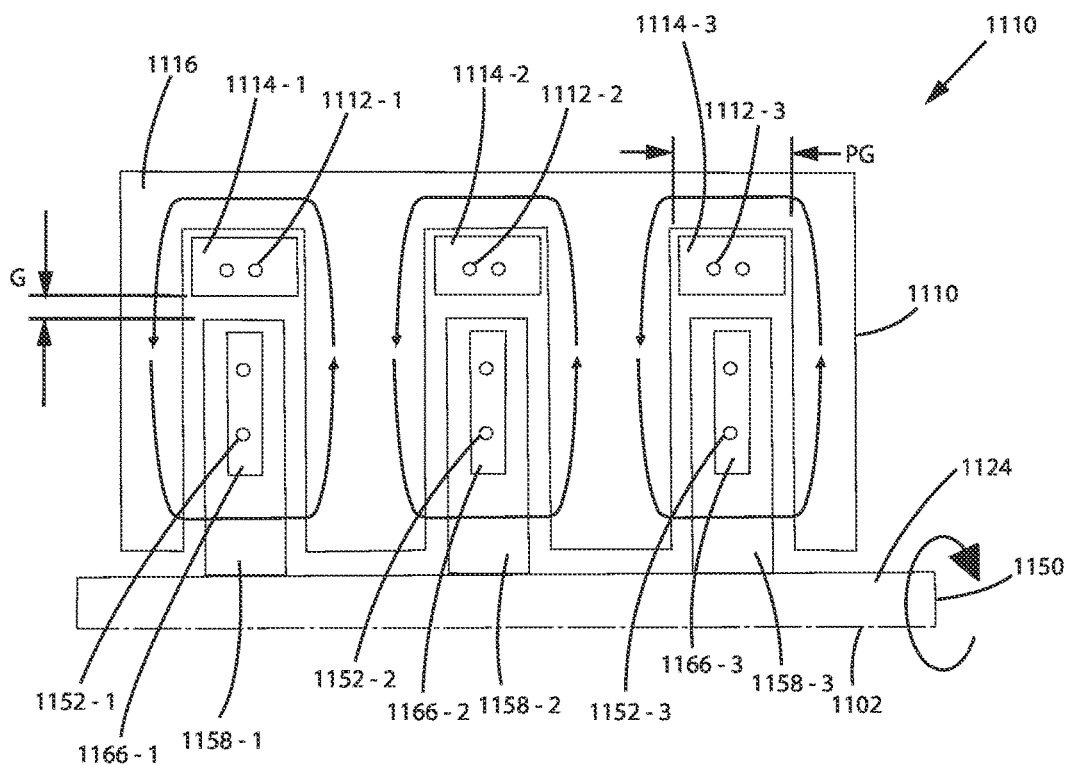
FIG. 21 shows a representative view of multiple rotary transformers in accordance with one embodiment.
Figure 22:
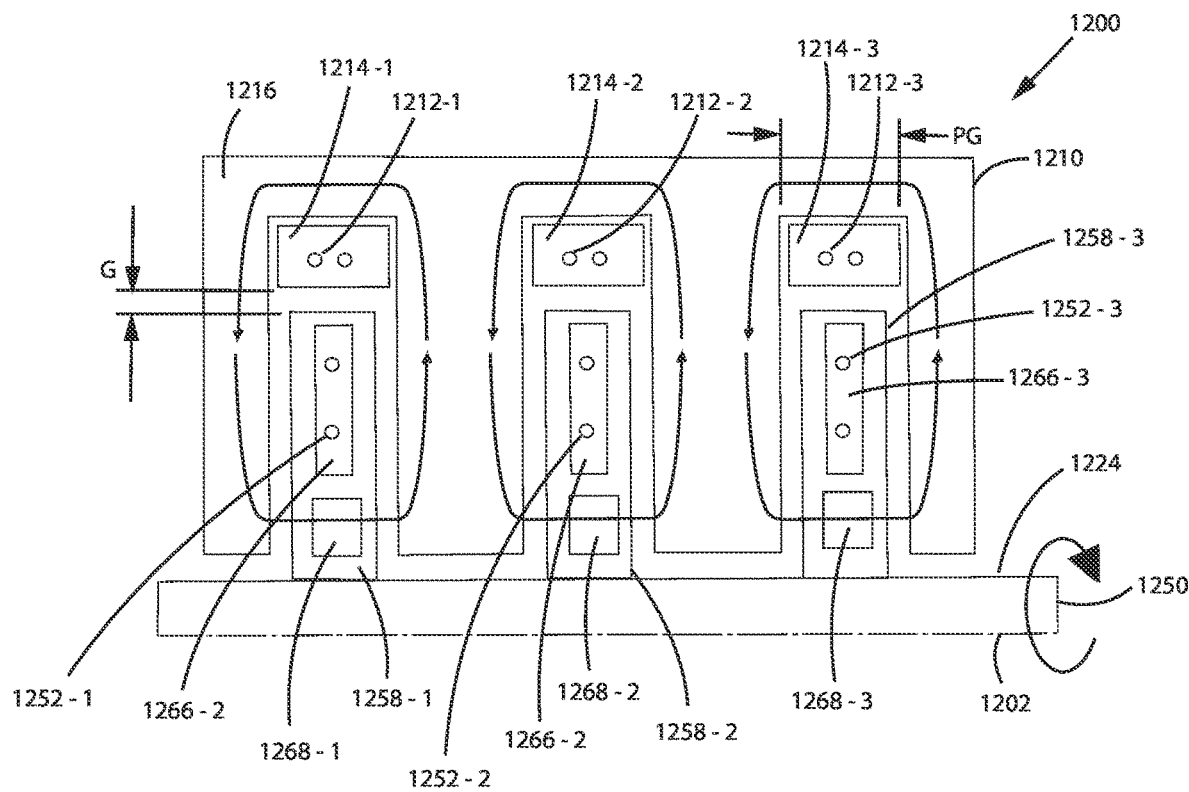
FIG. 22 shows a representative view of multiple rotary transformers in accordance with one embodiment.
Figure 23:
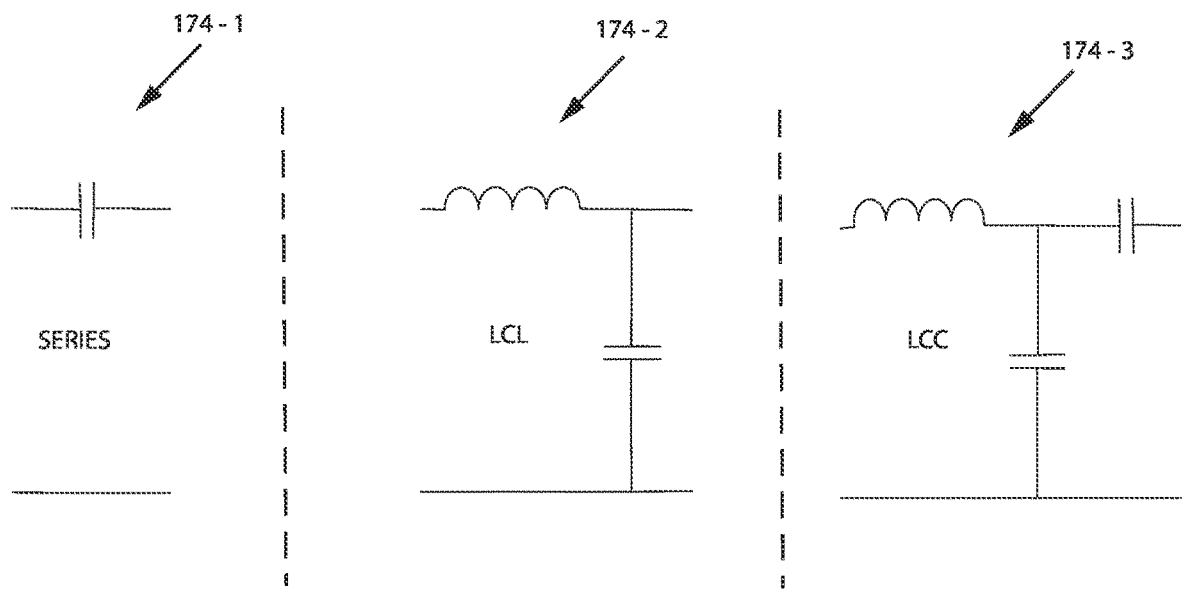
FIG. 23 shows various topologies of primary side compensation circuitry in accordance with one embodiment.
Figure 24:
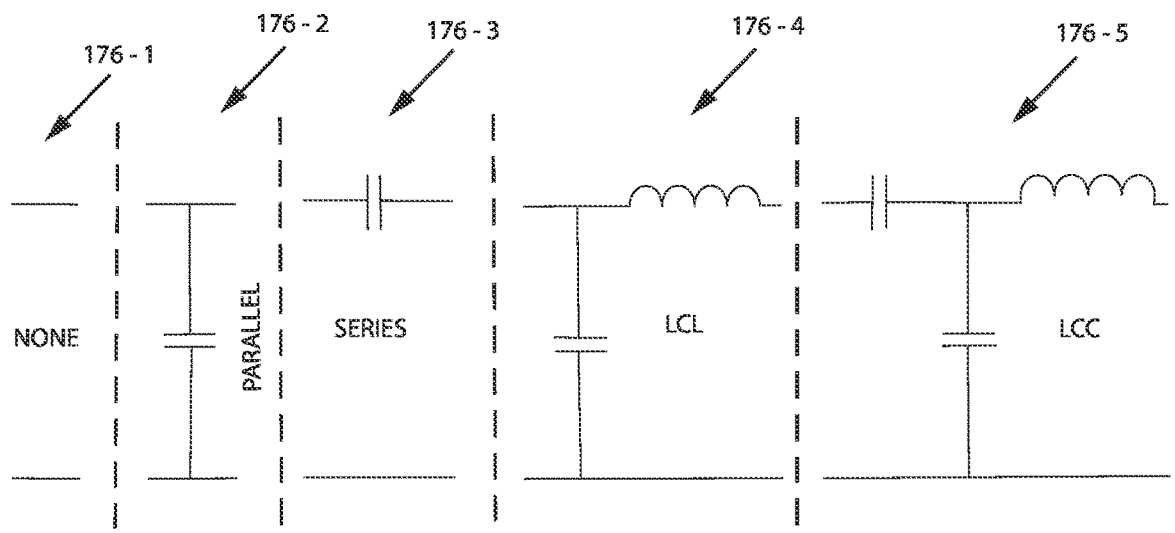
FIG. 24 shows various topologies of secondary side compensation circuitry in accordance with one embodiment.
Figure 25:
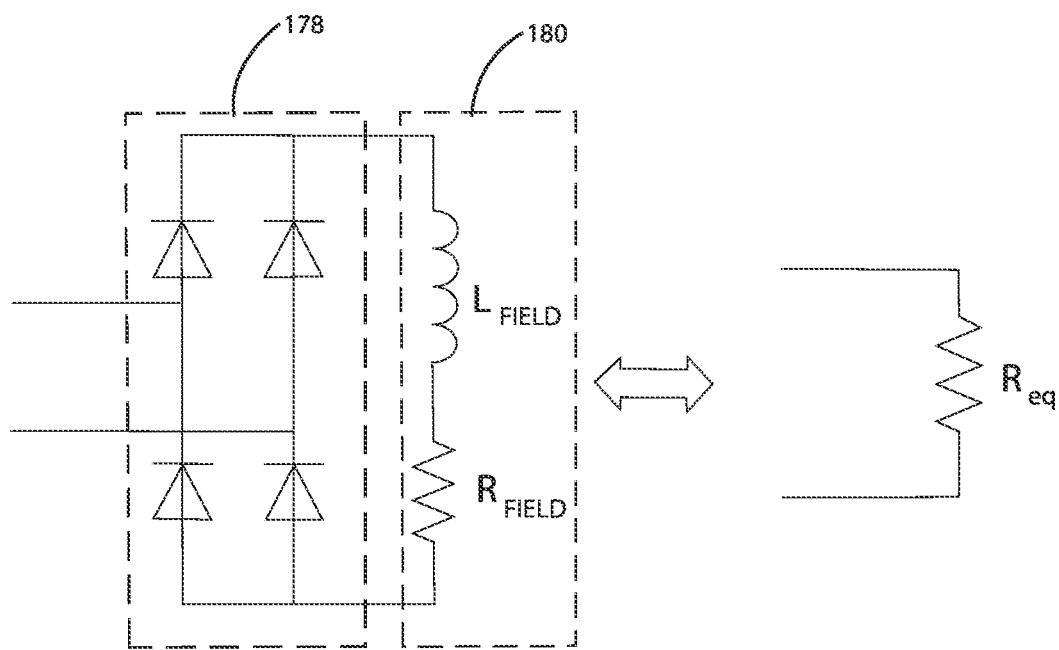
FIG. 25 shows rectification circuitry and a load in accordance with one embodiment.
Figure 26:
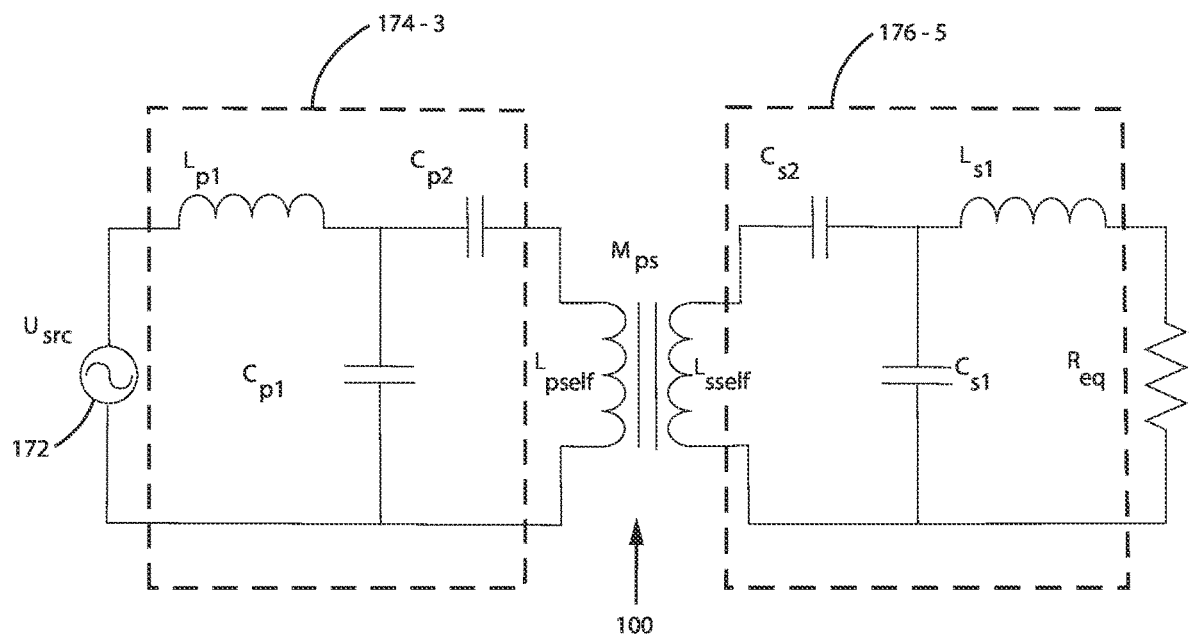
FIG. 26 depicts a representative circuit of a system in accordance with one embodiment.
Figure 27:
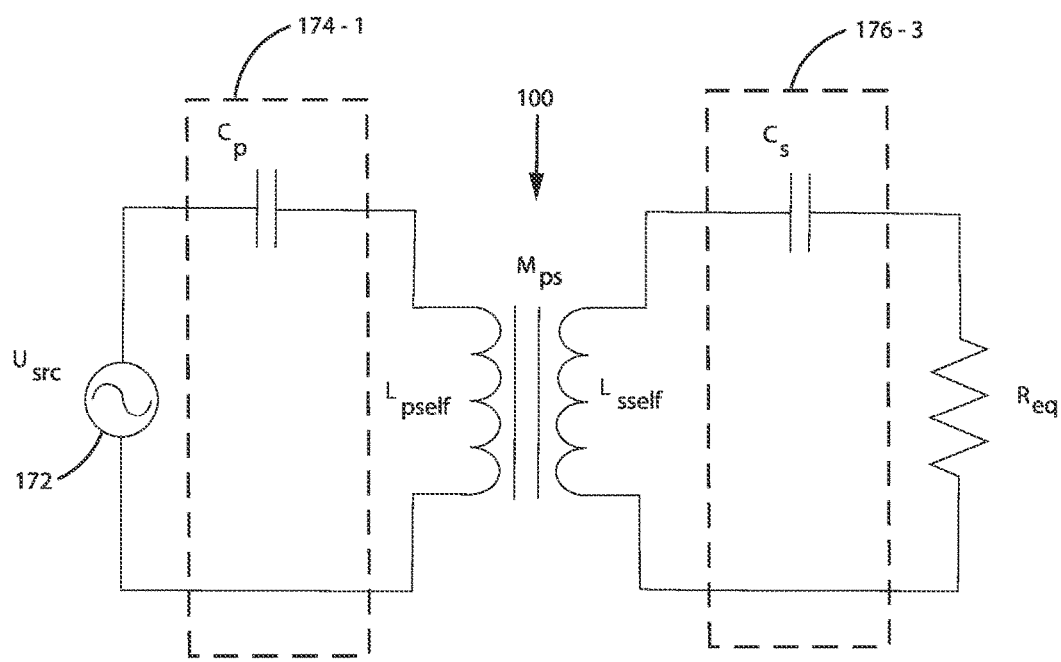
FIG. 27 depicts a representative circuit of a system in accordance with one embodiment.
Figure 28:
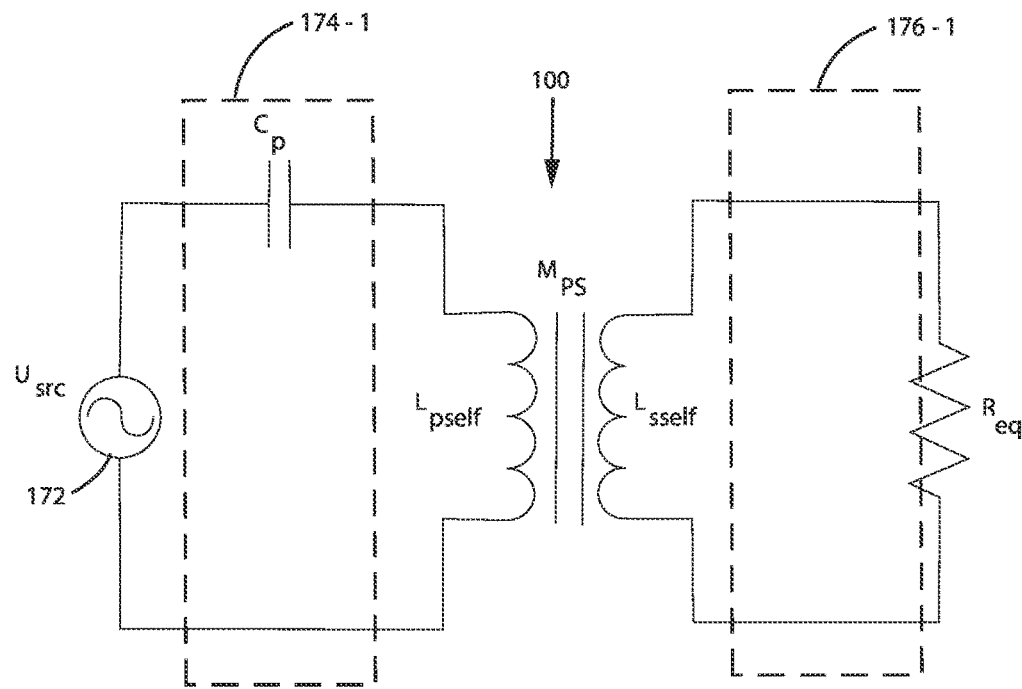
FIG. 28 depicts a representative circuit of a system in accordance with one embodiment.
Figure 29:
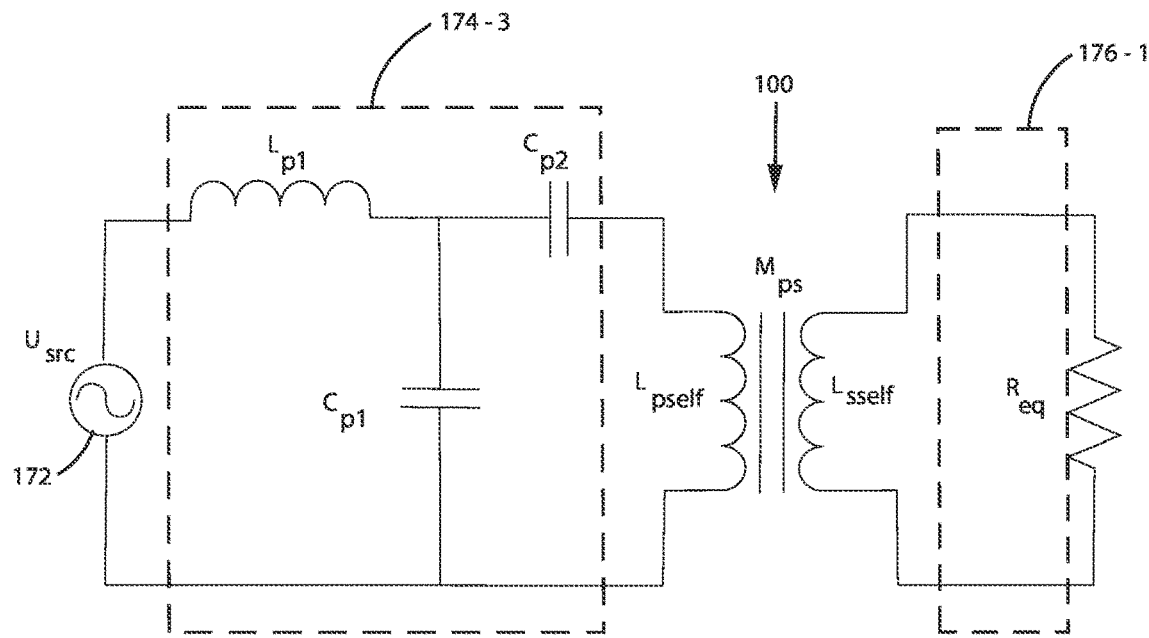
FIG. 29 depicts a representative circuit of a system in accordance with one embodiment.

In the illustrated embodiments of FIGS. 21-22, the primary winding 1112AB-1, 1112AB-2, 1112AB-3, 122AB-1, 1212AB-2, 1212AB-3 and the secondary winding 1116-1, 1116-2, 1116-3, 1216-1, 1216-2, 1216-3 are disposed in an axial overlapping arrangement.

In the illustrated embodiments of FIGS. 21-22, a rotary transformer 1100, 1200 is depicted in a configuration similar to the rotary transformer 600, but with multiple forms of the rotary transformer 600. As noted herein, for purposes of disclosure, parts of the rotary transformer 1100, 1200 that are similar in name to parts of the rotary transformer 600 are designated by reference numbers that share the same first two digits (e.g., 11XX and 6XX designate similarly named components). Similarly, with respect to the rotary transformer 1100, 1200 with multiple rotary transformers, components of respective ones of the rotary transformers are designated by a hyphenated number (e.g., secondary winding 1152-1 and secondary winding 1152-2 are respective components of first and second rotary transformers of the rotary transformer 1100.

The rotary transformer rotary transformer 1100, 1200 in the illustrated embodiment may form part of the excitation system as described herein. The rotary transformer 1100, 1200 may include first, second, and third rotary transformers associated with components hyphenated respectively -1, -2, -3. It is to be understood that a greater or lesser number of rotary transformers may be incorporated into the rotary transformer 1100, 1200. The rotary transformer 1100, 1200 may include primary windings 1112-1, 1112-2, 1112-3, 1212-1, 1212-2, 1212-3 and a secondary winding 1152-1, 1152-2, 1152-3, 1252-1, 1252-2, 1252-3 separated by a gap, defined at least in part by a gap G between opposing surfaces of the rotor 1150-1, 1150-2, 1150-3, 1250-1, 1250-2, 1250-3 and the stator 1110-1, 1110-2, 1110-3, 1210-1, 1210-2, 1210-3, and disposed adjacent to a primary ferromagnetic core 1116, 1216, which may be shared by the first, second, in third rotary transformers, and a secondary ferromagnetic core 1166-1, 1166-2, 1166-3, 1266-1, 1266-2, 1266-3. The rotary transformer 1100, 1200 may include a primary ferromagnetic core 1116, 1116 and a secondary ferromagnetic core 1166-1, 1166-2, 1166-3, 1266-1, 1266-2, 1266-3, with the secondary winding 1152-1, 1152-2, 1152-3, 1252-1, 1252-2, 1252-3 and the secondary ferromagnetic core 1166-1, 1166-2, 1166-3, 1266-1, 1266-2, 1266-3 operable to rotate about a central axis 1102, 1202 relative to the primary winding 1112AB-1, 1112AB-2, 1112AB-3, 1212AB-1, 1212AB-2, 1212AB-3.

The rotary transformer 1100, 1200 in the illustrated embodiment includes a shaft 1124, 1224 coupled to the rotor 1150-1, 1150-2, 1150-3, 1250-1, 1250-2, 1250-3 that rotates about the central axis 1102, 1202. First and second bearings may be provided to support the shaft 1124, 1224 relative to the stator 1110-1, 1110-2, 1110-3, 1210-1, 1210-2, 1210-3. The rotor 1150-1, 1150-2, 1150-3, 1250-1, 1250-2, 1250-3 may include a rotor field winding and a rotor hub operable to support the rotor field winding and power electronics. The secondary winding 1152-1, 1152-2, 1152-3, 1252-1, 1252-2, 1252-3 may provide electrical power to the power electronics, which rotate with the rotor 1150-1, 1150-2, 1150-3, 1250-1, 1250-2, 1250-3.

In the illustrated embodiment of FIG. 22, the rotary transformer 1200 includes a second secondary ferromagnetic core 1268-1, 1268-2, 1268-3 configured to guide flux to reduce or prevent flux leakage and heat generation in other areas of the rotary transformer 1200, such as the housing, bearings, shaft plates, and shaft.

In the illustrated embodiment of FIGS. 21-22, the primary winding 1112AB-1, 1112AB-2, 1112AB-3, 1212AB-1, 1212AB-2, 1212AB-3 and the secondary winding 1116-1, 1116-2, 1116-3, 1216-1, 1216-2, 1216-3 are disposed in a radial overlapping arrangement.

Figure 20:
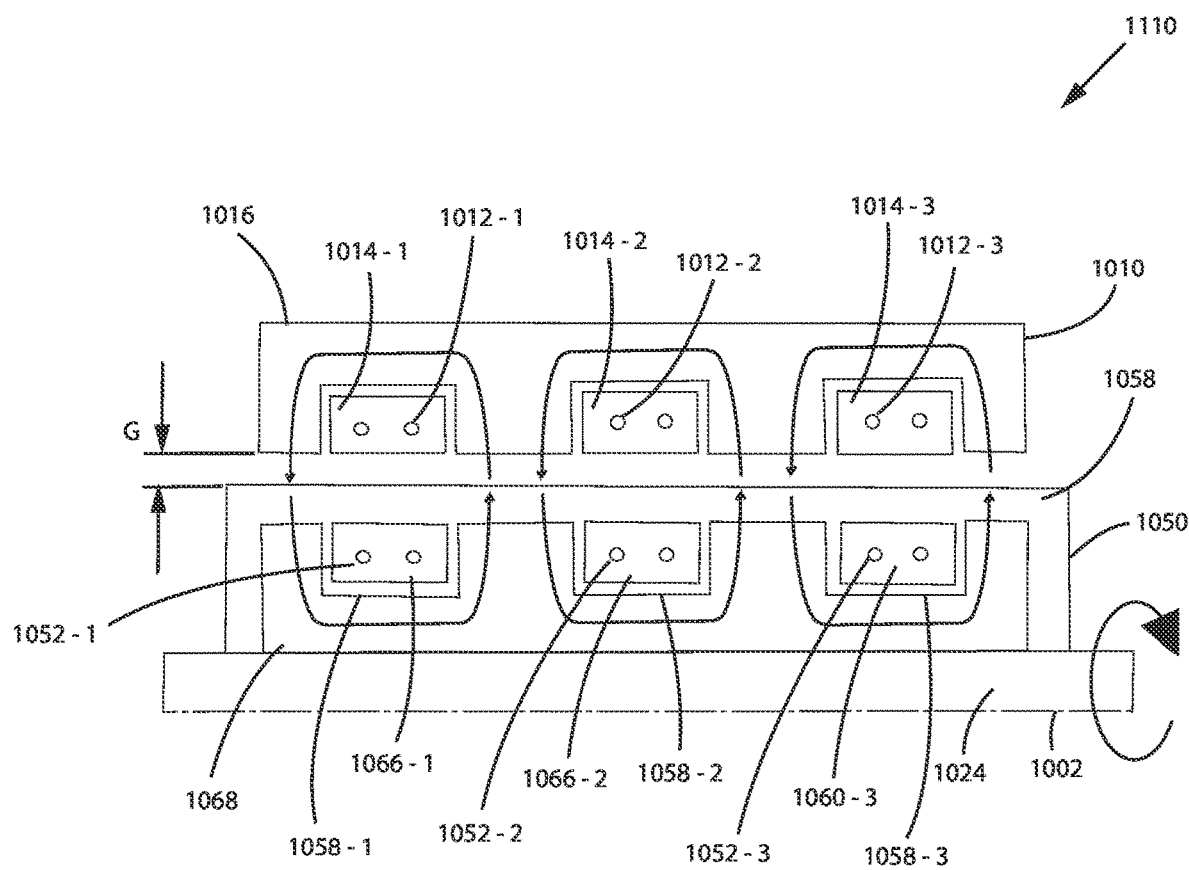
FIG. 20 shows a representative view of multiple rotary transformers in accordance with one embodiment.

In the illustrated embodiment of FIG. 20, a rotary transformer 1000 is depicted in a configuration similar to the rotary transformer 500, but with multiple forms of the rotary transformer 500. As noted herein, for purposes of disclosure, parts of the rotary transformer 1000 that are similar in name to parts of the rotary transformer 500 are designated by reference numbers that share the same first two digits (e.g., 10XX and 5XX designate similarly named components). Similarly, with respect to the rotary transformer 1000 with multiple rotary transformers, components of respective ones of the rotary transformers are designated by a hyphenated number (e.g., secondary winding 1052-1 and secondary winding 1052-2) are respective components of first and second rotary transformers of the rotary transformer 1000.

The rotary transformer rotary transformer 1000 in the illustrated embodiment may form part of the excitation system as described herein. The rotary transformer 1000 may include first, second, and third rotary transformers associated with components hyphenated respectively -1, -2, -3. It is to be understood that a greater or lesser number of rotary transformers may be incorporated into the rotary transformer 1000. The rotary transformer 1000 may include primary windings 1012-1, 1012-2, 1012-3 and a secondary winding 1052-1, 1052-2, 1052-3 separated by a gap, defined at least in part by a gap G between opposing surfaces of the rotor 1050-1, 1050-2, 1050-3 and the stator 1010-1, 1010-2, 1010-3, and disposed adjacent to a primary ferromagnetic core 1116, which may be shared by the first, second, in third rotary transformers, and a secondary ferromagnetic core 1066-1, 1066-2, 1066-3. The rotary transformer 1000 may include a primary ferromagnetic core 1016 and a secondary ferromagnetic core 1066-1, 1066-2, 1066-3, with the secondary winding 1052-1, 1052-2, 1052-3 and the secondary ferromagnetic core 1066-1, 1066-2, 1066-3 operable to rotate about a central axis 1002 relative to the primary winding 1012-1, 1012-2, 1012-3.

The rotary transformer 1000 in the illustrated embodiment includes a shaft 1024 coupled to the rotor 1050-1, 1050-2, 1050-3 that rotates about the central axis 1002. First and second bearings may be provided to support the shaft 1024 relative to the stator 1010-1, 1010-2, 1010-3. The rotor 1050-1, 1050-2, 1050-3 may include a rotor field winding and a rotor hub operable to support the rotor field winding and power electronics. The secondary winding 1052-1, 1052-2, 1052-3 may provide electrical power to the power electronics, which rotate with the rotor 1050-1, 1050-2, 1050-3.

In the illustrated embodiment of FIG. 20, the primary winding 1012-1, 1012-2, 1012-3 and the secondary winding 1016-1, 1016-2, 1016-3 are disposed in a radial overlapping arrangement.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An excitation system comprising:
a rotary transformer including:
a stator that includes a primary winding and a primary ferromagnetic-material core, wherein the primary winding includes first and second portions spaced apart to define a stator gap (PG),
a shaft configured to rotate relative to the stator during operation of the rotary transformer,
a rotor affixed to the shaft to rotate along with the shaft while being spaced apart from the stator by a predetermined gap (G) defined at least in part by the stator gap, the rotor including a secondary winding, wherein the primary winding and the secondary winding have axial overlap, and
a rotor support affixed to the rotor and configured to encapsulate the rotor, the rotor support being disposed within the stator gap between the primary winding and the secondary winding;
a primary compensation circuit electrically coupled with the primary winding of the stator, the primary compensation circuit configured to be in resonance with the primary winding;
a secondary compensation circuit electrically coupled with the secondary winding of the rotor and mechanically coupled with the rotor to rotate along with the rotor, wherein the secondary compensation circuit is configured to be in resonance with the secondary winding;
a motor-field winding; and
a rectifier electrically coupled between the secondary compensation circuit and the motor-field winding, wherein the rectifier and the motor-field winding are mechanically coupled with the rotor to rotate along with the rotor.

2. The excitation system of claim 1 wherein the predetermined gap or the stator gap is between 7 mm and 16 mm with respect to a system configured for 10 kW of power transfer.

3. The excitation system of claim 1 wherein:
the rotor includes ferromagnetic material arranged to confine flux lines; and
the rotor support further encapsulates the ferromagnetic material.

4. The excitation system of claim 1 wherein the shaft, the stator, and the rotor are disposed relative to each other in an axial-flux configuration.

5. The excitation system of claim 1 wherein the primary ferromagnetic-material core includes one or more of ferrite, soft magnetic composite, or laminated electrical steel.

6. The excitation system of claim 1 wherein the rotor support includes mechanically strong, non-conductive and non-magnetic material.

7. The excitation system of claim 6 wherein the rotor support material includes composite materials based on glass fiber or carbon fiber, G11, BMI, Thermoplastic, ceramic, and/or cermet.

8. The excitation system of claim 1 wherein the shaft includes metallic material.

9. The excitation system of claim 1 wherein the shaft includes non-conductive material.

10. The excitation system of claim 8 wherein the shaft material is non-magnetic.

11. The excitation system of claim 1 wherein the predetermined gap is sufficiently large, so the rotary transformer is capable of high-speed operation.

12. The excitation system of claim 1 wherein the primary compensation circuit is configured as one of a series circuit, an LCL circuit, or an LCC circuit.

13. The excitation system of claim 1 wherein the secondary compensation circuit is configured as one of a series circuit, a parallel circuit, an LCL circuit, or an LCC circuit.

14. The excitation system of claim 1 [3] wherein each of the primary compensation circuit and the secondary compensation circuit is configured as an LCC circuit.

15. The excitation system of claim 1 wherein each of the primary compensation circuit and the secondary compensation circuit is configured as an LCL circuit.

16. The excitation system of claim 1 wherein each of the primary compensation circuit and the secondary compensation circuit is configured as a series circuit.

17. The excitation system of claim 1 wherein the primary compensation circuit is configured as a series circuit.

18. The excitation system of claim 1 wherein the primary compensation circuit is configured as an LCC circuit.

19. The excitation system of claim 1 wherein the primary compensation circuit is configured as an LCL circuit.

20. The excitation system of claim 1 comprising:
a DC bus; and
an inverter electrically coupled between the DC bus and the primary compensation circuit.

* * * * *